United States Patent
Zheng et al.

(10) Patent No.: US 10,506,589 B2
(45) Date of Patent: *Dec. 10, 2019

(54) DATA TRANSMISSION METHOD, TERMINAL, AND BASE STATION IN LAA-LTE SYSTEM

(71) Applicant: HUAWEI TECHNOLOGIES CO., LTD., Shenzhen, Guangdong (CN)

(72) Inventors: Juan Zheng, Beijing (CN); Zuomin Wu, Shenzhen (CN); Lei Guan, Beijing (CN); Qiang Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/233,558

(22) Filed: Dec. 27, 2018

(65) Prior Publication Data

US 2019/0132841 A1 May 2, 2019

Related U.S. Application Data

(63) Continuation of application No. 15/968,964, filed on May 2, 2018, which is a continuation of application No. PCT/CN2015/095214, filed on Nov. 20, 2015.

(30) Foreign Application Priority Data

Nov. 6, 2015 (WO) ............... PCT/CN2015/094066

(51) Int. Cl.
*H04W 72/04* (2009.01)
*H04W 56/00* (2009.01)
(Continued)

(52) U.S. Cl.
CPC ......... *H04W 72/0446* (2013.01); *H04L 5/005* (2013.01); *H04L 27/2607* (2013.01);
(Continued)

(58) Field of Classification Search
CPC ......... H04W 72/0446; H04W 56/0005; H04W 72/0406; H04L 5/005; H04L 27/2607; H04L 27/2613

See application file for complete search history.

(56) References Cited

U.S. PATENT DOCUMENTS

2007/0297583 A1 12/2007 Shan
2010/0309797 A1 12/2010 Lindoff et al.
(Continued)

FOREIGN PATENT DOCUMENTS

CN 101090325 A 12/2007
CN 101179778 A 5/2008
(Continued)

OTHER PUBLICATIONS

3GPP TS 36.211 V12.7.0 (Sep. 2015), 3rd Generation Partnership Project; Technical Specification Group Radio Access Network; Evolved Universal Terrestrial Radio Access (E-UTRA); Physical channels and modulation(Release 12), Technical Specification, 136 pages.

(Continued)

*Primary Examiner* — Ronald B Abelson
(74) *Attorney, Agent, or Firm* — Gregg L. Jansen

(57) ABSTRACT

The present disclosure relates to example data transmission methods, user equipment, and access network devices in an LAA-LTE system. An example data receiving method includes determining, by user equipment, first information of a first cell. The user equipment determines a first subframe based on the first information, where a downlink data transmission length of the first subframe is less than a first threshold. The user equipment then determines a data transmission characteristic of the cell in the first subframe based on a preset condition, so as to receive, based on the data transmission characteristic, data including the first subframe. In doing so, a data transmission characteristic of a (Continued)

base station or a terminal is standardized, and a reference signal such as a DRS can be correctly identified.

16 Claims, 6 Drawing Sheets

(51) Int. Cl.
*H04L 5/00* (2006.01)
*H04L 27/26* (2006.01)
*H04L 27/00* (2006.01)

(52) U.S. Cl.
CPC ..... *H04L 27/2613* (2013.01); *H04W 56/0005* (2013.01); *H04W 72/0406* (2013.01); *H04L 27/0006* (2013.01)

(56) References Cited

U.S. PATENT DOCUMENTS

| | | |
|---|---|---|
| 2011/0237238 A1 | 9/2011 | Hassan et al. |
| 2015/0055632 A1 | 2/2015 | Gou et al. |
| 2015/0085688 A1 | 3/2015 | Damji et al. |
| 2015/0237589 A1 | 8/2015 | Quan et al. |
| 2016/0036576 A1* | 2/2016 | Wang ................ H04L 5/0048 |
| 2018/0219667 A1 | 8/2018 | Zhao et al. |

FOREIGN PATENT DOCUMENTS

| | | |
|---|---|---|
| CN | 101951639 A | 1/2011 |
| CN | 102461023 A | 5/2012 |
| CN | 103931246 A | 7/2014 |
| CN | 104283821 A | 1/2015 |
| EP | 3171561 A1 | 5/2017 |
| RU | 2012141029 A | 3/2014 |
| WO | 2012068731 A1 | 5/2012 |
| WO | 2015131749 A1 | 9/2015 |

OTHER PUBLICATIONS

Samsung, R1-155474, Partial subframe for LAA, 3GPP TSG RAN WG1 #82bis, 3GPP server release date: Sep. 26, 2015, total 6 pages.
3GPP TS 36.213 V12.7.0 (Sep. 2015), 3rd Generation Partnership Project; Technical Specification Group Radio Access Network; Evolved Universal Terrestrial Radio Access (E-UTRA); Physical layer procedures(Release 12), Technical Specification, 241 pages.
3GPP TS 36.214 V12.2.0 (Mar. 2015), 3rd Generation Partnership Project; Technical Specification Group Radio Access Network; Evolved Universal Terrestrial Radio Access (E-UTRA); Physical layer; Measurements(Release 12), Technical Specification, 17 pages.
R1-156057 MediaTek Inc: "Enhanced DRS Design for LAA", 3GPP TSG RAN WG1 Meeting #82b, Malmö, Sweden, Oct. 5-9, 2015. total 8 pages. XP051041862.
R1-155101 Huawei, HiSilicon: "DRS design and performance evaluation for LAA", 3GPP TSG RAN WG1 Meeting #82bis, Malmo, Sweden, Oct. 5-9, 2015. total 8 pages. XP051002089.
R1-155786 CMCC: "Discussion on discovery signal design for LAA", 3GPP TSG RAN WG1 Meeting #82bis, Malmö, Sweden, Oct. 5-9, 2015. total 4 pages. XP051039753.
R1-151854 Huawei et al.,"Further details on data transmission not starting from the subframe boundary", 3GPP TSG RAN WG1 Meeting #80bis, Belgrade, Serbia, Apr. 20-24, 2015, total 3 pages.
CATR, "Discussions on the design of initial signal for LAA", 3GPP TSG RAN WG1 Meeting #82 R1-154643, Beijing, China, Aug. 24-28, 2015, total 3 pages.

* cited by examiner

DATA TRANSMISSION METHOD, TERMINAL, AND BASE STATION IN LAA-LTE SYSTEM

CROSS-REFERENCE TO RELATED APPLICATIONS

This application is a continuation of U.S. patent application Ser. No. 15/968,964, filed on May 2, 2018, which is a continuation of International Application No. PCT/CN2015/095214, filed on Nov. 20, 2015, which claims priority to International Patent Application No. PCT/CN2015/094066, filed on Nov. 6, 2015. All of the afore-mentioned patent applications are hereby incorporated by reference in their entireties.

TECHNICAL FIELD

The present invention relates to the field of communications technologies, and in particular, to an LTE system working on an unlicensed frequency band.

BACKGROUND

In a wireless communications network, devices need to use a frequency resource to transmit information. The frequency resource is also referred to as a spectrum or a frequency band. The frequency band may include an authorized frequency band and an unauthorized frequency band. The unauthorized frequency band is also referred to as an unlicensed frequency band. The authorized frequency band is a dedicated frequency resource of some operators. The unlicensed frequency band is a common frequency resource in the wireless communications network. With the development of communications technologies, an increasing amount of information is transmitted in the wireless communications network. Transmitting information by using the unlicensed frequency band can improve a data throughput in the wireless communications network and better meet user requirements.

Using an Licensed-Assisted Access Using LTE (LAA-LTE) system as an example, an LAA-LTE technology is mainly intending to use a Carrier Aggregation (CA) configuration and structure in an existing Long Term Evolution (LTE) system, to configure, on the basis of configuring a carrier on a licensed frequency band (briefly referred to as a licensed carrier in this specification) of an operator for communication, multiple carriers on an unlicensed frequency band (briefly referred to as unlicensed carriers in this specification), and use the unlicensed carriers for communication with the assistance of the licensed carrier. That is, an LTE device may use a CA manner, to use a licensed carrier as a Primary Component Carrier (PCC) or a primary cell (PCell), and use an unlicensed carrier as an secondary component carrier (SCC) or an secondary cell (SCell). In this way, the LTE device not only can inherit, by using the licensed carrier, conventional advantages of the LTE device in wireless communication, for example, advantages in such aspects as mobility, security, quality of service, and simultaneous scheduling processing for multiple users, but also can implement network capacity offloading by using the unlicensed carrier, to reduce load of the licensed carrier. When using an unlicensed frequency band resource, an LAA system needs to obey specifications formulated by various regions for using an unlicensed frequency band.

Description of an Unlicensed Frequency Band:

Resource sharing on an unlicensed frequency band refers to that only limitations on indexes such as transmit power and out-of-band leakage are set for use of a particular spectrum, to ensure that a basic coexistence requirement is met between multiple devices that use the frequency band, and a radio technology, an operating enterprise, and a service life are not limited, but quality of service on the frequency band is not ensured. An operator may implement network capacity offloading by using an unlicensed frequency band resource, but needs to obey regulations and requirements of different regions and different spectrums for the unlicensed frequency band resource. These requirements are generally formulated to protect a common system such as a radar and ensure that multiple systems do not impose harmful impact to each other as far as possible and fairly coexist, and include a transmit power limitation, an out-of-band leakage index, and indoor and outdoor use limitations, and some regions further have some additional coexistence policies and the like.

Analysis on a Coexistence Specification of an Unlicensed Frequency Band:

For an unlicensed target frequency band that LAA-LTE considers to use, an listen before talk (LBT) coexistence specification needs to be obeyed in some regions and countries, for example, Europe and Japan. The listen before talk LBT is a coexistence policy between systems. When a wireless communications device (for example, for an LTE or LAA-LTE system, the wireless communications device may include a base station and user equipment) occupies the unlicensed frequency band for communication, a detect before use (that is, the LBT) rule needs to be used first. A basic idea of the LBT is: Before sending a signal on a channel, each communications device needs to first detect whether a current channel is idle, that is, whether it can be detected that a nearby node is occupying the channel detected by the communications device (that is, the current channel) to send a signal. This detection process may be referred to as a clear channel assessment (CCA). If it is detected within a period of time that the channel is idle, the communications device can send a signal. If it is detected that the channel has been occupied, the communications device currently cannot send a signal. In the foregoing process, the detecting whether a channel is idle may be implemented through signal detection, energy detection, or the like. Correspondingly, if no particular signal is detected, for example, for a Wireless Fidelity (Wi-Fi) system, the particular signal may be a preamble signal Preamble, it may be considered that the channel is idle. If energy detection is used, if received or detected energy is lower than a given threshold, it may also be considered that the channel is idle. Referring to FIG. 1, FIG. 1 is a schematic diagram of opportunistic data transmission on an unlicensed frequency band in LAA-LTE according to the prior art. In FIG. 1, based on the characteristic of the LBT, data transmission of an LTE device on the unlicensed frequency band is opportunistic, that is, not continuous.

To effectively use an unlicensed frequency band resource to transmit data and improve spectrum utilization efficiency, on an unlicensed frequency band, an LTE system may use a time resource less than one subframe (a partial subframe) and a frequency resource to transmit data, as shown in FIG. 2. FIG. 2 is a schematic diagram of opportunistic data transmission in a partial subframe on an unlicensed frequency band in LAA-LTE according to the prior art. In FIG. 2, data transmission in a partial subframe (that is, less than one subframe) in the LAA-LTE on the unlicensed frequency band is opportunistic. A time length of the partial subframe is generally less than 1 ms, a time length of a complete subframe is generally 1 ms. For example, when time and frequency resources included in the partial subframe are all used in downlink data transmission, a time length of the partial subframe that is used in the downlink data transmission is less than 1 ms.

Because a length of a partial subframe is less than 1 ms, impact is caused to sending of a reference signal of an LTE system. The reference signal herein includes a discovery reference signal (DRS), a cell-specific reference signal (CRS), a channel state information reference signal (CSI-RS), and the like. The reference signal may be used for an radio resource management (RRM) measurement, and may also be used for a channel state information (CSI) measurement. Using a DRS as an example, for opportunistic sending of data on an unlicensed frequency band, to resolve an radio resource management (RRM) measurement problem of user equipment (UE), the discovery reference signal (DRS) is used on the unlicensed frequency band to support an RRM measurement of the unlicensed frequency band. The RRM measurement herein includes a measurement for a serving cell and/or a neighboring cell by the UE, for example, an RSRP (Reference Signal Received Power, reference signal received power) measurement, an reference signal received quality (RSRQ) measurement, or an received signal strength indicator (RSSI) measurement. Considering an inter-frequency measurement problem, the DRS is generally sent in a configured discovery signals measurement timing configuration (DMTC), and duration of the DMTC is 6 milliseconds. The DRS includes a primary synchronization signal (PSS), an secondary synchronization signal (SSS), a CRS, and a configurable CSI-RS. A time range including DRS sending is generally referred to as a DRS Occasion or DRS occasion duration, and may be represented by an integer quantity of orthogonal frequency division multiplexing (OFDM) symbols, or may be represented by an integer quantity of subframes. For example, assuming that the DRS occasion duration is one subframe, a representation form of time and frequency resources for sending a DRS is shown in FIG. 3. FIG. 3 is a schematic diagram of a DRS according to the prior art. As seen from reference signals included in the DRS, if the DRS does not include a configurable CSI-RS, the DRS may be less than 1 ms in time, that is, may include only 12 OFDM symbols. Herein, that the DRS includes 12 OFDM symbols in time is described with respect to a quantity of OFDM symbols occupied by a start position to an end position of the DRS. In FIG. 3, within one subframe (1 ms), the start position of the DRS is a first symbol (carrying a CRS), and the end position of the DRS is a twelfth symbol (carrying a CRS). Therefore, the DRS includes 12 OFDM symbols in time. It should be noted that FIG. 3 is considered for a case in which a downlink data transmission configuration is a normal cyclic prefix, and FIG. 3 shows only REs (Resource Element, resource element) occupied by a DRS in time and frequency resources consisting of 12 subcarriers and 14 OFDM symbols (corresponding to a length of one subframe in the normal cyclic prefix configuration), where the DRS includes a PSS, an SSS, and a CRS.

Generally, when UE executes an RRM measurement, especially an RRM measurement of a neighboring cell (which is not a serving cell of the UE), the UE first determines, on a target frequency band based on whether a PSS and an SSS are detected, whether a target cell exists on the target frequency band. Herein, a carrier on which the target cell is located is the target frequency band. Then the UE may determine whether there is a DRS in a DMTC, and if the UE detects a PSS and an SSS in the DMTC, the UE determines that there is a DRS in the DMTC (because a DRS includes a PSS and an SSS). Then the UE uses a reference signal included in a DRS occasion (a time range for DRS sending), such as a CRS, or a CRS and a CSI-RS, to execute the RRM measurement. This causes a problem, that is, in a case in which an LAA-LTE system performs opportunistic data transmission and supports data transmission in a partial subframe, due to transmission in the partial subframe, complete DRS data sending and receiving cannot be ensured, causing the UE to misinterpret the DRS, which directly causes an incorrect RRM measurement when the UE executes an RRM measurement of a neighboring cell.

Similarly, the partial subframe also affects sending of a CSI-RS. Currently, transmission in a partial subframe also occurs in an LTE system. That is, in a time division duplexing (TDD) system, a data transmission length of a downlink pilot timeslot (DwPTS) included in a special subframe is less than 1 ms, and for user equipment in an LTE system release 12, CSI-RS transmission is not supported in the DwPTS. Generally, a CSI-RS resource is periodically configured. For opportunistic transmission on an unlicensed frequency band, if the partial subframe does not support CSI-RS data transmission, either, sending of a periodic CSI-RS may be missed, and a measurement by the user equipment on channel state information of the unlicensed frequency band is affected.

In conclusion, for an LTE system working on an unlicensed frequency band, in the case of opportunistic data transmission, to improve spectrum utilization efficiency, transmission in a partial subframe may be used. When the transmission in a partial subframe is used, how to set a data transmission feature of the partial subframe to ensure that user equipment correctly interprets a reference signal in the partial subframe and ensure an accurate RRM and/or CSI measurement is an important problem to be resolved.

SUMMARY

The present invention provides a data transmission method, user equipment, and an access network device in an LAA-LTE system, to resolve a DRS misinterpreting problem.

According to a first aspect, the present invention provides a data receiving method. First, user equipment determines first information of a first cell. Then the user equipment determines a first subframe based on the first information, where a downlink data transmission length of the first subframe is less than a first threshold. Finally, the user equipment determines a data transmission characteristic of the cell in the first subframe based on a preset condition.

According to a second aspect, the present invention provides a data sending method. First, an access network device determines a downlink data transmission length of a first subframe transmitted by a first cell. The downlink data transmission length of the first subframe is less than a first threshold. Then the access network device determines a data transmission feature of the first cell in the first subframe based on a preset condition.

According to a third aspect, the present invention provides user equipment. The user equipment includes a processor. The processor is configured to: determine first information of a first cell, and determine a first subframe based on the first information. A downlink data transmission length of the first subframe is less than a first threshold. The processor is further configured to determine a data transmission characteristic of the first cell in the first subframe based on a preset condition.

According to a fourth aspect, the present invention provides an access network device. The access network device includes a determining unit. The determining unit is configured to determine a downlink data transmission length of a first subframe transmitted by a first cell, where the downlink data transmission length of the first subframe is less than a first threshold. The determining unit is further configured to determine a data transmission feature of the first cell in the first subframe based on a preset condition.

According to the data transmission method, the user equipment, and the access network device provided in the present invention, a prior-art problem is resolved that, in a case in which an LTE system performs opportunistic data transmission and supports data transmission in a partial subframe, due to transmission in the partial subframe, complete DRS data sending and receiving cannot be ensured, causing UE to misinterpret a DRS. According to the data transmission method in the present invention, a DRS can be correctly interpreted, implementing a correct RRM and/or CSI measurement.

In an optional implementation manner, the first information is control information and/or a reference signal including a reference sequence and/or pre-configuration information, where the control information and/or the reference signal including a reference sequence is used to indicate that the downlink data transmission length of the first subframe is less than the first threshold, and the configuration information is used to indicate a longest time within which the first cell transmits data on a carrier on which the first cell is located.

In an optional implementation manner, the preset condition is that the first subframe is a first subframe or a sixth subframe in a radio frame, and the first subframe is located in a DMTC of the carrier on which the first cell is located; and the data transmission characteristic is that a last OFDM symbol of a first slot included in the first subframe does not include a primary synchronization signal and/or a second last OFDM symbol of a first slot included in the first subframe does not include a secondary synchronization signal.

In an optional implementation manner, the preset condition is that the first subframe is a first subframe or a sixth subframe in a radio frame, and the first subframe is located in a DMTC of the carrier on which the first cell is located; and the data transmission characteristic is that the downlink data transmission length of the first subframe is an element included in a first time set.

In an optional implementation manner, when a downlink data transmission configuration of the first cell is a normal cyclic prefix, the element included in the first time set is only: one or more of three OFDM symbols, six OFDM symbols, 12 OFDM symbols, 14 OFDM symbols, or 13 OFDM symbols; or when a downlink data transmission configuration of the first cell is an extended cyclic prefix, the element included in the first time set is only: one or more of three OFDM symbols, five OFDM symbols, 10 OFDM symbols, or 12 OFDM symbols.

In an optional implementation manner, if the preset condition is that the first subframe is a first subframe or a sixth subframe in a radio frame, and the first subframe is located in a DMTC of the carrier on which the first cell is located, the data transmission characteristic is that the downlink data transmission length of the first subframe is an element included in a second time set. If the preset condition is that the first subframe is a first subframe or a sixth subframe in a radio frame, and the first subframe is not located in a DMTC of the carrier on which the first cell is located, the data transmission characteristic is that the downlink data transmission length of the first subframe is an element included in a third time set. The second time set has an element different from that in the third time set.

In an optional implementation manner, when a downlink data transmission configuration of the first cell is a normal cyclic prefix, the element included in the second time set is: one or more of three OFDM symbols, six OFDM symbols, 12 OFDM symbols, 14 OFDM symbols, or 13 OFDM symbols, and the element included in the third time set is: one or more of three OFDM symbols, six OFDM symbols, nine OFDM symbols, 10 OFDM symbols, 11 OFDM symbols, 12 OFDM symbols, 14 OFDM symbols, or 13 OFDM symbols. When a downlink data transmission configuration of the first cell is an extended cyclic prefix, the element included in the second time set is: one or more of three OFDM symbols, five OFDM symbols, 10 OFDM symbols, or 12 OFDM symbols, and the element included in the third time set is: one or more of three OFDM symbols, five OFDM symbols, eight OFDM symbols, nine OFDM symbols, 10 OFDM symbols, or 12 OFDM symbols.

In an optional implementation manner, a data transmission start position of the first subframe is on a subframe boundary, and the first subframe is a last subframe in a transmission burst.

In an optional implementation manner, the carrier on which the first cell is located belongs to an unlicensed frequency band.

In an optional implementation manner, the determining, by the user equipment, a data transmission characteristic of the first cell in the first subframe based on a preset condition includes: When a time resource of a CSI-RS and/or a CSI-IM of the user equipment overlaps the first subframe, the first subframe includes the CSI-RS and/or the CSI-IM of the user equipment. In an optional implementation manner, the determining, by the access network device, a data transmission characteristic of the first cell in the first subframe based on a preset condition includes: when the first subframe includes a CSI-RS and/or a CSI-IM, sending the first subframe including the CSI-RS and/or the CSI-IM.

For user equipment in an LTE system release 12, CSI-RS transmission is not supported in a DwPTS, but in the embodiments, CSI-RS transmission can be supported, so that channel state information of an unlicensed frequency band can be measured.

In an optional implementation manner, the reference sequence is one or more of a constant amplitude zero auto correlation sequence, a binary sequence, an m sequence, a pseudo-random sequence, or a ZC sequence.

In an optional implementation manner, when a downlink data transmission configuration is a normal cyclic prefix, the downlink data transmission length of the first subframe is less than 12 OFDM symbols. Further, the downlink data transmission length of the first subframe is less than 12 OFDM symbols but greater than five OFDM symbols. When a downlink data transmission configuration is an extended cyclic prefix, the downlink data transmission length of the first subframe is less than 10 OFDM symbols. Further, the downlink data length of the first subframe is less than 10 OFDM symbols but greater than four OFDM symbols.

In an optional implementation manner, the user equipment is a relay or a terminal device, and the access network device is an LTE base station.

DESCRIPTION OF EMBODIMENTS

The following describes the embodiments of the present invention with reference to accompanying drawings.

Figure 1:
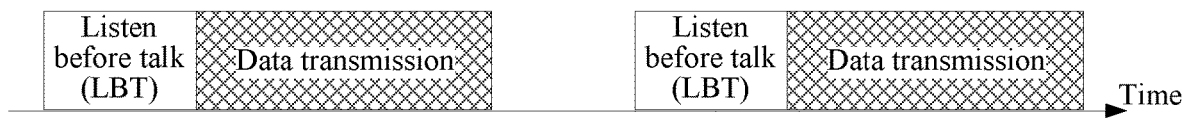
FIG. 1 is a schematic diagram of opportunistic data transmission on an unlicensed frequency band in existing LAA-LTE.
Figure 2:
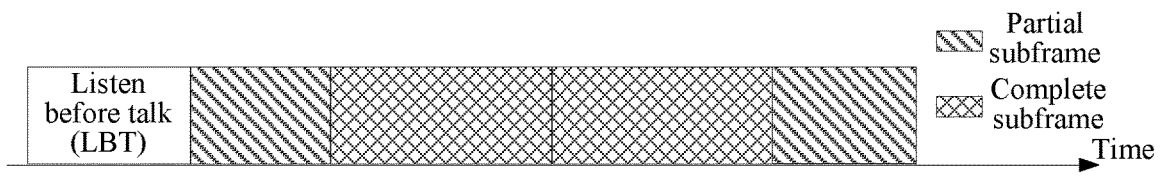
FIG. 2 is a schematic diagram of opportunistic data transmission in a partial subframe on an unlicensed frequency band in existing LAA-LTE.
Figure 3:
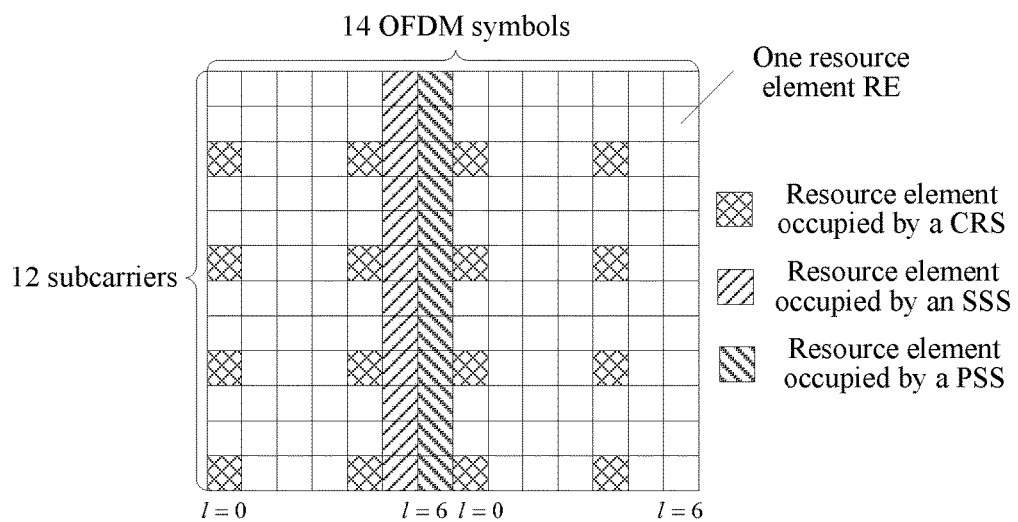
FIG. 3 is a schematic diagram of an existing DRS.
Figure 4:
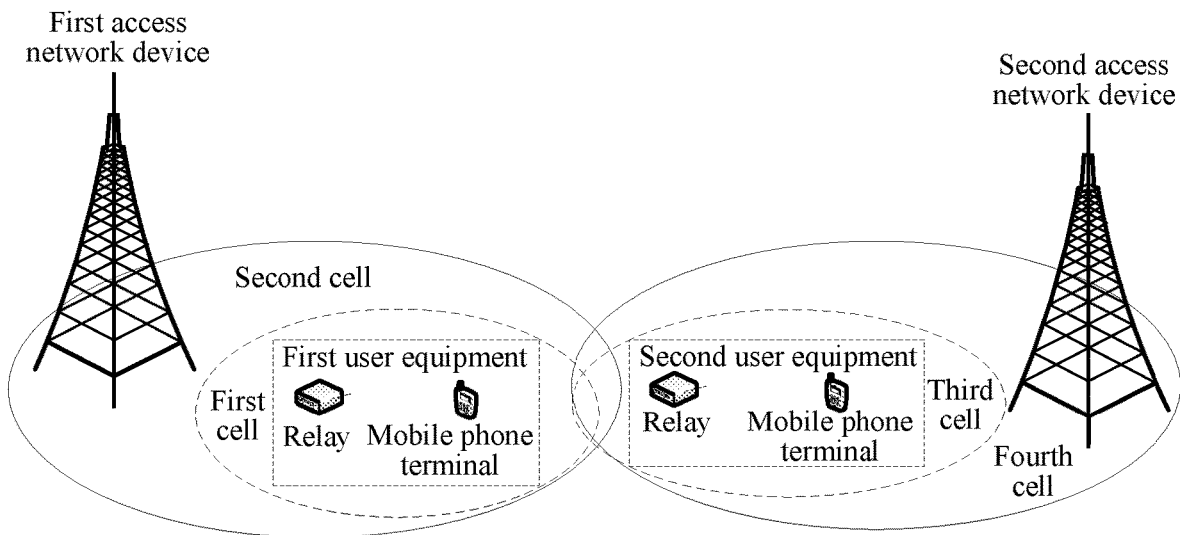
FIG. 4 is a schematic diagram of data transmission between an access network device and user equipment according to an embodiment of the present invention.

FIG. 4 is a schematic diagram of data transmission between an access network device and user equipment. FIG. 4 is a simple schematic diagram of a wireless communications system, and does not limit an application scenario of the present invention. For example, a wireless communications system in the present invention may be an LTE system independently working on an unlicensed frequency band, or may be a licensed-assisted access using LTE system, that is, an LAA-LTE system.

In FIG. 4, an access network device and user equipment communicate with each other. In an example, the access network device is a base station. The base station may be a base station corresponding to a cell, such as a macro base station, or may be a base station corresponding to a small cell. Only a macro base station is used as an example in FIG. 4 to show data transmission between an access network device and user equipment. Actually, the access network device in the present invention may be any type of base station. The small cell herein includes: a metro cell, a micro cell, a pico cell, a femto cell, and the like. These small cells are characterized by small coverage and low transmit power, and are applicable to providing a high rate data transmission service. In an example, the user equipment (UE) may be a terminal device, such as a mobile phone terminal, or may be a relay. Any device that can perform data communication with the access network device (for example, a base station) may be the user equipment.

In FIG. 4, a first cell and a second cell are neighboring cells. There may be multiple neighboring cells, and only two cells are used as an example in FIG. 4 for description. In FIG. 4, a first access network device (for example, an LTE base station) serves two cells, that is, the first cell and the second cell. The first cell and the second cell may be cells jointly used through CA. For an LAA-LTE system, the first cell may be a cell on an unlicensed frequency band, that is, may be considered as a secondary cell, and the second cell may be a cell on a licensed frequency band, that is, may be considered as a primary cell. The first cell and the second cell may jointly provide a data service to first user equipment through CA. Similarly, in FIG. 4, a second access network device (for example, an LTE base station) serves two cells, that is, a third cell and a fourth cell. The third cell and the fourth cell may be cells jointly used through CA. For an LAA-LTE system, the third cell may be a cell on an unlicensed frequency band, that is, may be considered as a secondary cell, and the fourth cell may be a cell on a licensed frequency band, that is, may be considered as a primary cell. The third cell and the fourth cell may jointly provide a data service to second user equipment through CA. It should be noted that the access network devices may serve multiple cells, and carriers on which the second cell and the fourth cell are located are not limited. In FIG. 4, the first cell and the second cell are in a co-site deployment, and both belong to the first access network device, and the third cell and the fourth cell are in a co-site deployment, and both belong to the second access network device. It should be noted that, in the embodiments of the present invention, multiple cells that are aggregated through CA may be not in a co-site deployment. In addition, in this embodiment of the present invention, besides using a CA manner to enable multiple cells to provide a data service to user equipment, a non-CA manner such as a dual connectivity (DC) manner may be used to enable multiple cells to provide a data service to user equipment.

It should be noted that, in the embodiments, a licensed frequency band and an unlicensed frequency band both may include one or more carriers, and carrier aggregation or dual connectivity is performed on the licensed frequency band and the unlicensed frequency band.

Besides, multiple cells may simultaneously work on one carrier at a same frequency. In some special scenarios, it may be considered that in an LTE system, a concept of a carrier is equivalent to that of a cell. For example, in a CA scenario, when a secondary carrier is configured for UE, both a carrier index of the secondary carrier and a cell identification (Cell ID) of a secondary cell working on the secondary carrier are carried. In this case, it may be considered that a concept of a carrier is equivalent to that of a cell. For example, that UE accesses a carrier is equivalent to that the UE accesses a cell. In the embodiments of the present invention, the concept of a cell is used for description.

In an LTE system, to enable user equipment to effectively access a system, an LTE base station (or a cell served by an LTE base station, for example, a first/second/third/fourth cell in FIG. 4) generally sends a synchronization signal and public broadcast information at a fixed time position and a fixed frequency position. For frequency division duplexing (FDD), a PSS and an SSS are usually sent in a subframe 0 (that, a first subframe) and a subframe 5 (that is, a sixth subframe) in each radio frame. The subframe 0 represents a subframe whose subframe index number is 0, and the subframe 5 represents a subframe whose subframe index number is 5.

A typical scenario is: A first access network device (which, in the embodiments of the present invention, may be an LTE base station in FIG. 4, or may be a cell served by the LTE base station, for example, the first cell) sends a PSS and an SSS in a subframe 0 or a subframe 5 in a radio frame, where a subframe including the PSS and the SSS is a partial subframe, and the subframe including the PSS and the SSS is located in a DMTC of a carrier on which the first cell is located. Signals, namely, the PSS and the SSS, included in the subframe 0 or the subframe 5 are the same as signals, namely, a PSS and an SSS, in a DRS. Therefore, in this case, when user equipment (the first user equipment or the second user equipment) obtains a DRS in the first cell, because a subframe received by the user equipment includes the PSS and the SSS, the user equipment (the first user equipment or the second user equipment) incorrectly determines that the subframe includes a complete DRS. However, actually, the subframe is a partial subframe, and DRS information included in the partial subframe is not complete. As a result, the user equipment (the first user equipment or the second user equipment) misinterprets the DRS. If the user equipment (the first user equipment or the second user equipment) uses the misinterpreted DRS to perform an RRM measurement or channel state information measurement or state information interference measurement, an incorrect measurement result is obtained.

Figure 5:
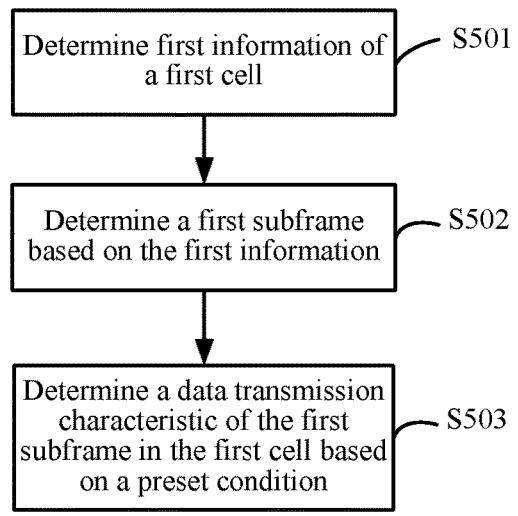
FIG. 5 is a flowchart of a data receiving method according to an embodiment of the present invention.

FIG. 5 is a flowchart of a data receiving method according to an embodiment of the present invention.

S501: User equipment determines first information of a first cell.

In an example, the user equipment detects the first information in the first cell. Further, the user equipment detects the first information on a working carrier or carrier frequency of the first cell, where the working carrier of the first cell belongs to an unlicensed frequency band. That is, the user equipment detects the first information on a target carrier, where the target frequency band is a frequency band on which the first cell is located. That the target frequency band is a frequency band on which the first cell is located refers to that the first cell may transmit data by using the target frequency band.

For example, if the working carrier frequency of the first cell is F1, the user equipment detects the first information on a frequency resource corresponding to the working carrier frequency F1. The frequency resource may be represented by a center frequency of the frequency resource and a size of the frequency resource. The working carrier of the first cell (which may also be referred to as a carrier on which the first cell is located) may be configured by an access network device (for example, a base station) in the first cell for the user terminal. After the user terminal obtains the configured working carrier of the first cell, the user equipment detects the first information on the carrier.

Preferably, the first information carries identity information of the first cell. For example, the first information carries a cell identification (Cell ID) of the first cell, so that the user equipment can determine whether the first information detected by the user equipment belongs to the first cell.

It should be noted that the first cell may include a serving cell of the user equipment, and may further include a neighboring cell of the serving cell of the user equipment (for example, the third cell in FIG. 4). The serving cell and the neighboring cell may be located on a same carrier or different carriers.

In an embodiment of the present invention, the first information is control information, and the user equipment detects the control information on a control data channel and/or a service data channel of the first cell, or the user equipment detects the control information on a control data channel and/or a service data channel of a second cell, where the first cell is a serving cell of the user equipment, for example, a secondary cell, and the second cell is also a serving cell of the user equipment, for example, a primary cell. A carrier on which the second cell is located is different from the carrier on which the first cell is located. The first cell and the second cell may jointly provide a data service to the user equipment through CA or DC. Correspondingly, if the user equipment detects the control information by using the control data channel and/or the service data channel of the second cell, to determine a first subframe, and the first subframe is a subframe in the first cell, it may be considered that the second cell indicates the first subframe by using a cross-carrier indication. If the user equipment detects the control information by using the control data channel and/or the service data channel of the first cell, to determine the first subframe, it may be considered that the first cell indicates the first subframe by using an intra-carrier indication.

The control data channel of the first cell (or the second cell) is one or more of control data channels supported by an LTE system, such as a physical downlink control channel (PDCCH), a physical control format indicator channel (PCFICH), a physical hybrid automatic repeat request indicator channel (PHICH), an enhanced physical downlink control channel (EPDCCH), and a physical broadcast channel (PBCH).

The service data channel of the first cell (or the second cell) is one or more of service data channels supported by the LTE system, such as a physical downlink shared channel (PDSCH) and a physical multicast channel (PMCH).

Figure 6:
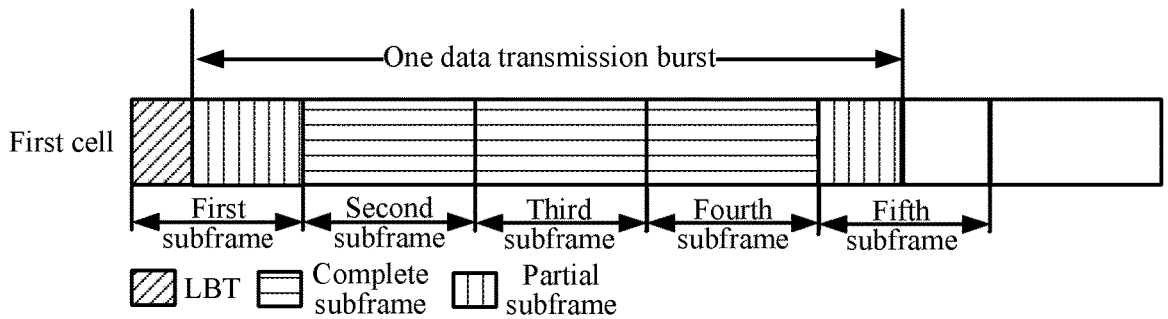
FIG. 6 is a schematic diagram of a data transmission burst according to an embodiment of the present invention.

In an example, a subframe that carries the control information is any subframe that is included in the first cell and that is in one burst data transmission, referring to FIG. 6; or may be any subframe in the second cell. More specifically, the burst data transmission may be any subframe within a time range, corresponding to one burst data transmission of the first cell, of the second cell. The second cell and the first cell are jointly used through CA or DC. Preferably, the carrier on which the second cell is located and a working frequency range of the second cell belong to a frequency resource included in a licensed frequency band. For the working frequency range of the second cell and the time range, corresponding to the burst data transmission of the first cell, of the second cell, refer to FIG. 7. That is, the control information may be sent by using the first cell, or may be sent by using the second cell. That is, the control information may be carried by using time and frequency resources included in the service data channel of the first cell or time and frequency resources included in the control data channel of the first cell, or may be carried by using time and frequency resources included in the service data channel of the second cell or time and frequency resources included in the control data channel of the second cell. The control information may be user equipment (UE) specific control information, or may be cell specific control information. Particularly, when the control information is UE specific control information, the control information may be carried in downlink data scheduling signaling for scheduling the UE.

FIG. 6 is a schematic diagram of a data transmission burst. In LAA-LTE, data transmission is opportunistic. One time of continuous data transmission is one burst data transmission, the burst data transmission includes multiple subframes, and the multiple subframes include a complete subframe and a partial subframe. The control information may be carried in any subframe in the burst data transmission. The burst data transmission herein refers to a time range within which the first cell can transmit data without using a contention based mechanism such as an LBT mechanism after the first cell preempts an unlicensed frequency band resource. It should be noted that, in this embodiment of the present invention, that the control information is carried in a subframe refers to that the control information is sent by using time and frequency resources included in the subframe.

Figure 7:
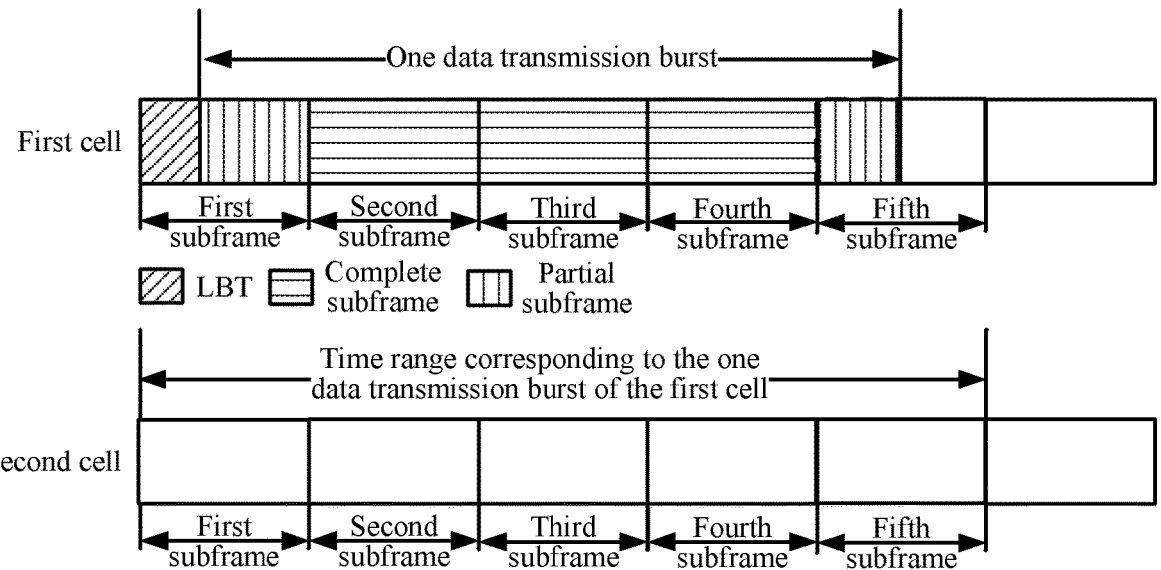
FIG. 7 is a schematic diagram of a time range, corresponding to one burst data transmission of a first cell, of a second cell according to an embodiment of the present invention.

FIG. 7 is a schematic diagram of a time range, corresponding to one burst data transmission of a first cell, of a second cell according to an embodiment of the present invention. More generally, the first information may be carried in another subframe of the second cell, and the another subframe may indicate a status of one or more subframes in one burst data transmission of the first cell.

It should be noted that, in this embodiment of the present invention, the control information indicates that downlink data transmission of the first subframe is less than a first threshold. When the first threshold is 1 ms, the control information directly indicates that a target subframe is the first subframe (for example, a partial subframe). Alternatively, the control information may directly indicate a data transmission length of a target subframe, and in this case, the UE determines, based on a correspondence between the data transmission length of the target subframe and the first threshold, whether the target subframe is the first subframe (or the partial subframe). The target subframe herein may be any subframe in one burst data transmission of the first cell, for example, any one of a first/second/third/fourth/fifth subframe in FIG. 6. Alternatively, the target subframe may be any subframe on the carrier on which the first cell is located. When the first threshold is greater than 1 ms, the control information may indicate whether the target subframe is a subframe in one burst data transmission of the first cell. Explanation of one burst data transmission is the same as above, and details are not described.

In another embodiment of the present invention, the first information is a reference signal including a reference sequence.

Specifically, the user equipment detects, in each subframe included in one burst data transmission of the first cell, whether there is a reference signal including a reference sequence, where the first cell may include a serving cell of the user equipment. Besides, the user equipment may detect, in each subframe included in a second cell, whether there is a reference signal including a reference sequence, to determine whether a subframe, corresponding to the subframe, of the first cell is a first subframe. Herein, the subframe, corresponding to the subframe, of the first cell may include a subframe having a same subframe index number as the subframe, or a subframe having a fixed subframe offset.

Preferably, the user equipment performs detection on a third OFDM symbol in each subframe in one burst data transmission of the first cell, to detect whether there is a reference signal including a reference sequence in the third OFDM symbol. Further, the user terminal detects, in a third OFDM symbol in each subframe included in one burst data transmission, whether there is a primary synchronization signal (PSS). That is, if the user equipment detects a PSS in a third OFDM symbol in a target subframe, the user equipment may determine that the target subframe is the first subframe (or a partial subframe). Otherwise, the user equipment may determine that the target subframe is a complete subframe. The target subframe herein is any subframe in one burst data transmission. Besides, because a CRS carries the identity information of the first cell, the user equipment may determine, by detecting the CRS, whether the target subframe is the first subframe. That is, after detecting the CRS, the user equipment may determine that a subframe including the CRS is the first subframe. In other words, if the CRS is detected, it indicates that the first cell has preempted an unlicensed frequency band resource including the carrier on which the first cell is located, and in this case, a first threshold may be greater than 1 ms.

In this embodiment of the present invention, for a method for identifying, by the user equipment, one burst data transmission of the first cell on the carrier on which the first cell is located, a control information detection method or a reference signal detection method may be used. This is not limited herein. After determining one burst data transmission, the user equipment may determine the target subframe.

The reference sequence may include but is not limited to the following sequences: a constant amplitude zero auto correlation (CAZAC) sequence, a binary sequence, an m sequence, a pseudo-random sequence, and a Zadoff-Chu (ZC) sequence.

It should be noted that the reference sequence may correspond to different data transmission lengths of the target subframe, where explanation of the target subframe is the same as above. In this embodiment of the present invention, the target subframe may include one subframe in one burst data transmission of the first cell on the carrier on which the first cell is located, or may be any subframe on the carrier on which the first cell is located.

Figure 8:
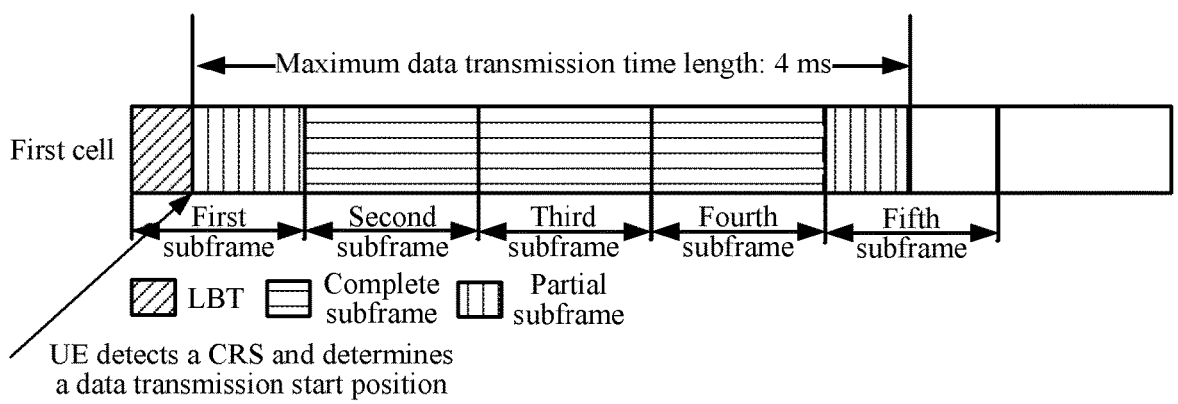
FIG. 8 is a schematic diagram of determining a first subframe according to pre-configuration information according to an embodiment of the present invention.

In still another embodiment of the present invention, the first information is pre-configuration information, and the pre-configuration information indicates a longest time within which the first cell transmits data on the carrier on which the first cell is located. The longest data transmission time refers to a maximum time range of one burst data transmission of the first cell on the carrier on which the first cell is located. For example, in Japan, for use of an unlicensed frequency band, it is clearly defined in a regulation that a maximum data transmission time is 4 ms. In addition, in Europe, for use of an unlicensed frequency band, it is clearly defined in a regulation that a maximum data transmission time is 10 ms or 13 ms or 8 ms. These values may be understood as a maximum time range of one burst data transmission. FIG. 8 is a schematic diagram of determining a first subframe based on pre-configuration information according to an embodiment of the present invention. In FIG. 8, the user equipment may first determine a start position of one burst data transmission, which may be implemented by detecting control information, detecting a reference sequence, or the like, which is not specifically limited in this embodiment of the present invention. In FIG. 8, the user equipment detects a CRS and determines a start position of one burst data transmission, and then obtains a position of a first subframe through calculation based on the pre-configuration information. For example, if a first threshold is a value greater than 1 ms, the first subframe may be a normal subframe included in the burst data transmission. If the first threshold is equal to 1 ms, the first subframe may be a last subframe in the burst data transmission, that is, a fifth subframe marked in FIG. 8.

Besides, the pre-configuration information may be a standard protocol specification, or may be configured for the user terminal by the access network device in the first cell (for example, an LTE base station) by using higher layer signaling, for example, indicated to the user terminal by using radio resource control (RRC) signaling.

S502: The user equipment determines a first subframe based on the first information, where a downlink data transmission length of the first subframe is less than a first threshold.

In an example, when a downlink data transmission configuration of the first cell is a normal cyclic prefix, the first threshold is 14 OFDM symbols or 1 ms (millisecond); and in this case, a complete subframe includes 14 OFDM symbols, or a time resource occupied by a complete subframe is 1 millisecond (1 ms). When a downlink data transmission configuration of the first cell is an extended cyclic prefix, the first threshold is 12 OFDM symbols or 1 ms; and in this case, a complete subframe includes 12 OFDM symbols, or a time resource occupied by a complete subframe is 1 millisecond (1 ms).

It should be noted that the first threshold may be greater than 1 ms; and in this case, the first subframe may include a complete subframe, or may include a partial subframe (that is, a subframe whose length in downlink data transmission is less than 1 ms).

In an embodiment of the present invention, the user equipment determines the first subframe based on the control information, and the control information indicates that the downlink data transmission length of the first subframe is less than the first threshold. In other words, the user equipment determines the partial subframe based on the control information, which includes determining a time position of the partial subframe.

Besides, the control information may indicate that a particular subframe is the first subframe (or the partial subframe), where the particular subframe may be a subframe carrying the control information, or may be a subframe indicated by the control information. The subframe indicated by the control information, that is, the particular subframe, may be represented by a subframe index number, or may be represented by a subframe after the subframe including the control information, where a given time interval exists between the subframe and the subframe including the control information, and the time interval may be represented by an integer quantity of OFDM symbols or an integer quantity of slots or an integer quantity of Tss. A Ts corresponds to a reciprocal of a sampling rate used for data transmission in an LTE system. For example, in the LTE system, a length corresponding to 307200 Tss is one radio frame, that is, 10 ms, and a length corresponding to 15360 Tss is half a subframe (one slot), that is, 0.5 ms.

In FIG. 6, the first subframe is a last subframe in one burst data transmission (the fifth subframe in FIG. 6) when the first cell transmits data on the working carrier of the first cell (that is, the carrier on which the first cell is located). The control information may be carried in the last subframe, to indicate that a current subframe is the first subframe, or the control information may be carried in any subframe in one burst data transmission, for example, a second subframe, a third subframe, or a fourth subframe included in the burst data transmission, to indicate that a last subframe is the first subframe. It should be noted that, in FIG. 6, a data transmission length of a first subframe included in the burst data transmission is less than 1 ms. Although the first subframe is a partial subframe, the first subframe is not the first subframe determined based on the first information. In this embodiment of the present invention, the first subframe is the last subframe in the burst data transmission in FIG. 6, that is, the fifth subframe in FIG. 6. As can be seen from that a data transmission start position included in the first subframe is on a subframe boundary. A data transmission start position included in the first subframe is not on a subframe boundary. Therefore, the first subframe in FIG. 6 is not the first subframe.

Besides, the subframe carrying the control information may be any subframe in one burst data transmission of the first cell, or may be any subframe in the second cell. The second cell is the same as that described above, and the second cell and the first cell may jointly provide a data service to the user equipment through CA or DC or the like.

In still another embodiment of the present invention, the user equipment determines the first subframe based on the pre-configuration information, and the pre-configuration information indicates the longest time within which the first cell transmits data on the carrier on which the first cell is located. The first subframe is a last subframe in the data transmission, and the user equipment determines the first subframe based on the pre-configuration information.

Preferably, the user terminal obtains a position of the first subframe based on the pre-configuration information by determining a start position of a data transmission burst. Specifically, the user equipment determines, through blind CRS detection in each subframe included in the first cell, whether the first cell has preempted an unlicensed frequency band resource in the currently detected subframe. Once the user terminal detects a CRS, the user terminal determines that the first cell has preempted an unlicensed frequency band resource in the currently detected subframe. In this case, the user terminal uses a position of the currently detected CRS as a start position of a data transmission burst, and then determines, based on the pre-configuration information (that is, a configured longest data transmission time), a position of a last subframe included in the burst data transmission, to determine the first subframe.

S503: The user equipment determines a data transmission characteristic of the first subframe in the first cell based on a preset condition, so that the user equipment receives, based on the data transmission characteristic, data including the first subframe.

In an embodiment of the present invention, if the preset condition is that the first subframe is a first subframe (that is, a subframe 0) or a sixth subframe (that is, a subframe 5) in a radio frame, and the first subframe is located in a discovery signals measurement timing configuration (DMTC) of the carrier on which the first cell is located, the data transmission characteristic is that a last OFDM symbol of a first slot included in the first subframe does not include a primary synchronization signal and/or a second last OFDM symbol of a first slot included in the first subframe does not include a secondary synchronization signal. That is, a preset rule (or the determining, by the user equipment, a data transmission characteristic of the cell in the first subframe based on a preset condition) is: When the first subframe is a first subframe or a sixth subframe in a radio frame, and the first subframe is located in the DMTC of the carrier on which the first cell is located, a last OFDM symbol of a first slot included in the first subframe does not include a primary synchronization signal and/or a second last OFDM symbol of a first slot included in the first subframe does not include a secondary synchronization signal. It should be noted that the preset rule may be explained as "the determining, by the user equipment, a data transmission characteristic of the cell in the first subframe based on a preset condition", which is also applicable to another implementation manner on a user equipment side.

In another embodiment of the present invention, if the preset condition is that the first subframe is a first subframe (that is, a subframe 0) or a sixth subframe (that is, a subframe 5) in a radio frame, the data transmission characteristic is that a last OFDM symbol of a first slot included in the first subframe does not include a primary synchronization signal and/or a second last OFDM symbol of a first slot included in the first subframe does not include a secondary synchronization signal. That is, a preset rule is: When the first subframe is a first subframe or a sixth subframe in a radio frame, a last OFDM symbol of a first slot included in the first subframe does not include a primary synchronization signal and/or a second last OFDM symbol of a first slot included in the first subframe does not include a secondary synchronization signal.

In this implementation manner, if the first subframe does not include a PSS and/or an SSS, the user equipment detects no PSS and/or SSS when executing an RRM measurement, and therefore does not incorrectly consider that the first subframe includes DRS sending. In this case, even though the first subframe is a partial subframe, the user equipment does not misinterpret the RRM measurement, thereby ensuring accuracy of the RRM measurement.

The following describes in detail relationships between a radio frame, a subframe, a slot, and an OFDM symbol. For an LTE system, one radio frame includes 10 subframes, and each subframe includes two slots. If a data transmission configuration is a normal cyclic prefix and a subcarrier spacing is 15 KHz, each subframe includes 14 OFDM symbols, and each slot includes seven OFDM symbols. If a data transmission configuration is an extended cyclic prefix and a subcarrier spacing is 15 KHz, each subframe includes 12 OFDM symbols, and each slot includes six OFDM symbols. In an LTE system, a radio frame may be represented by a radio frame index number, and the radio frame index number is any integer value in 0 to 1023. A subframe may be represented by a position in a radio frame, and the position in a radio frame may be represented by a subframe index. The subframe index is any integer value in 0 to 9. A subframe whose subframe index number is M corresponds to an $(M+1)^{th}$ subframe in a radio frame. A slot may also be represented by a position in a radio frame, and the position in a radio frame may be represented by a slot index. The slot index is any integer value in 0 to 19. A slot whose slot index number is N corresponds to an $(N+1)^{th}$ slot in a radio frame. An OFDM symbol may be represented by a position in a subframe, or may be represented by a position in a slot. The position in a subframe may be represented by an OFDM symbol index, the OFDM symbol index is an any integer value in 0 to 13 or 0 to 11, and an OFDM symbol whose OFDM symbol index is K corresponds to a $(K+1)^{th}$ OFDM symbol in a subframe. The position in a slot may also be represented by an OFDM symbol index, the OFDM symbol index is any integer value in 0 to 6 or 0 to 5, and an OFDM symbol whose OFDM symbol index is L corresponds to an $(L+1)^{th}$ OFDM symbol in a slot.

As can be seen from that, if the downlink data transmission configuration is a normal cyclic prefix, the last OFDM symbol of the first slot refers to a seventh OFDM symbol of the first slot, which is also a seventh OFDM symbol included in the first subframe, and the second last OFDM symbol of the first slot refers to a sixth OFDM symbol of the first slot, which is also a sixth OFDM symbol included in the first subframe. If the downlink data transmission configuration is an extended cyclic prefix, the last OFDM symbol of the first slot refers to a sixth OFDM symbol of the first slot, which is also a sixth OFDM symbol included in the first subframe, and the second last OFDM symbol of the first slot refers to a fifth OFDM symbol of the first slot, which is also a fifth OFDM symbol included in the first subframe. A process of analysis for a case in which the downlink data transmission configuration is an extended cyclic prefix is the same as above, and details are not described herein.

Besides, when the first subframe is a partial subframe, to reduce complexity, for data transmission of the first subframe, reference may be made to a data resource mapping manner supported by a downlink pilot timeslot (DwPTS). The DwPTS is a structure in time division duplexing (TDD) and LTE systems, and the DwPTS is included in a special subframe. A frame structure in an existing TDD LTE system includes a downlink subframe, a special subframe, and an uplink subframe. An example in which a radio frame includes two special subframes is used for description below, as shown in FIG. 9.

Figure 9:
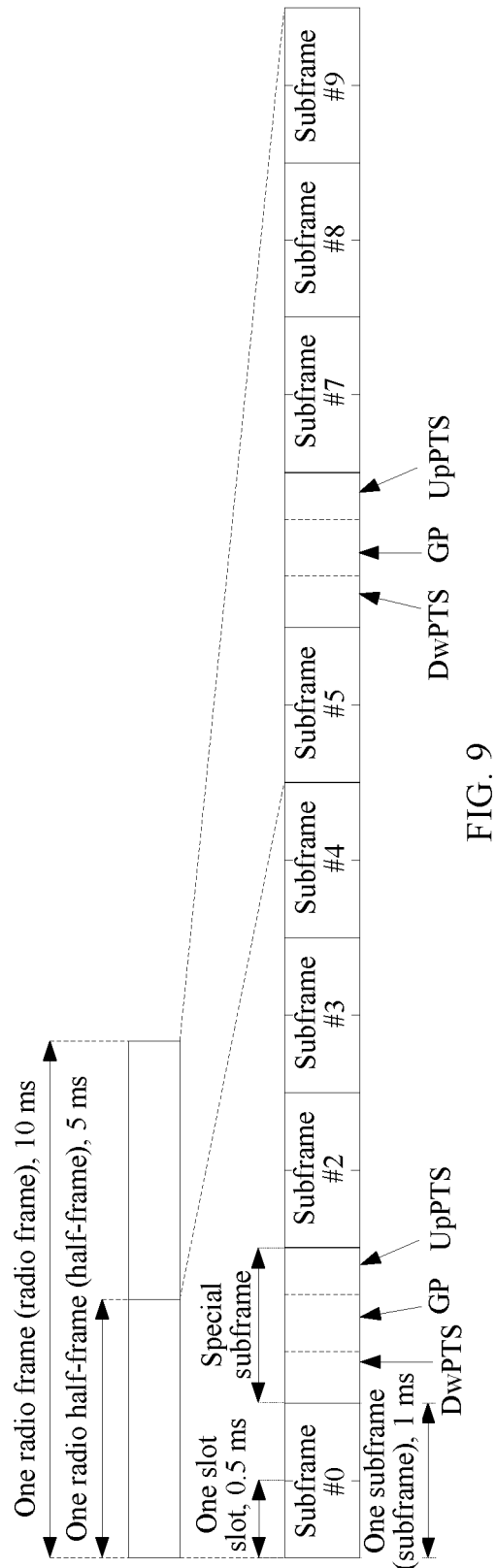
FIG. 9 is a schematic structural diagram of a TDD LTE system frame.

FIG. 9 is a schematic diagram of a frame structure in a TDD LTE system. A length of a special subframe is 1 ms, that is, one subframe, and the special subframe consists of a DwPTS, a guard period (GP), and an uplink pilot timeslot (UpPTS). Currently, the TDD LTE system respectively defines different special subframe configurations for two cases: a downlink normal cyclic prefix and a downlink extended cyclic prefix. Different special subframe configurations are different in a length of at least one of a DwPTS, a GP, or an UpPTS included therein, as shown in Table 1. In Table 1, lengths of the DwPTS and the UpPTS are represented by quantities of symbols, and a time occupied by the GP may be calculated by subtracting a time occupied by the DwPTS and the UpPTS from a length of a subframe (that is, 1 ms).

It should be noted that a quantity of OFDM symbols included in the UpPTS in Table 1 is not only applicable to a case in which an uplink is a normal cyclic prefix (NCP), but also applicable to a case in which the uplink is an extended cyclic prefix (ECP). For example, assuming that a special subframe configuration is 0, in a case in which the downlink is an NCP, a DwPTS includes three OFDM symbols, and in the cases of the uplink NCP and the uplink ECP, an UpPTS includes one OFDM symbol.

TABLE 1

| | Normal CP (NCP) | | Extended CP (ECP) | |
|---|---|---|---|---|
| Configuration | DwPTS | UpPTS | DwPTS | UpPTS |
| 0 | 3 | 1 | 3 | 1 |
| 1 | 9 | 1 | 8 | 1 |
| 2 | 10 | 1 | 9 | 1 |
| 3 | 11 | 1 | 10 | 1 |
| 4 | 12 | 1 | 3 | 2 |
| 5 | 3 | 2 | 8 | 2 |
| 6 | 9 | 2 | 9 | 2 |
| 7 | 10 | 2 | 5 | 2 |
| 8 | 11 | 2 | | |
| 9 | 6 | 2 | | |

With reference to a quantity of OFDM symbols supported by the DwPTS, when the downlink data transmission configuration is a normal cyclic prefix, the downlink data transmission length of the first subframe is less than 12 OFDM symbols. Further, the downlink data transmission length of the first subframe is less than 12 OFDM symbols but greater than five OFDM symbols. When the downlink data transmission configuration is an extended cyclic prefix, the downlink data transmission length of the first subframe is less than 10 OFDM symbols, or the downlink data length of the first subframe is less than 10 OFDM symbols but greater than four OFDM symbols.

Besides, considering that when the downlink data transmission configuration is a normal cyclic prefix, a DRS includes 12 OFDM symbols in time, if a data transmission length of the first subframe is less than 12 OFDM symbols, the length is not sufficient to support DRS sending. Therefore, the preset rule may be: When the first subframe is a first subframe or a sixth subframe in a radio frame, and the first subframe is located in the DMTC of the carrier on which the first cell is located, when and only when the data transmission length of the first subframe is less than 12 OFDM symbols, a last OFDM symbol of a first slot included in the first subframe does not include a primary synchronization signal and/or a second last OFDM symbol of a first slot included in the first subframe does not include a secondary synchronization signal. Moreover, considering that when the data transmission length of the first subframe is not greater than five OFDM symbols, the first cell is limited by the data transmission length and therefore cannot send a PSS or an SSS in the first subframe, when the data transmission length of the first subframe is not greater than five OFDM symbols, a DRS-based RRM measurement is not affected, either. Therefore, the preset rule may be: When the first subframe is a first subframe or a sixth subframe in a radio frame, and the first subframe is located in the DMTC of the carrier on which the first cell is located, and when the downlink data transmission configuration is a normal cyclic prefix, when and only when the data transmission length of the first subframe is less than 12 OFDM symbols or is less than 12 OFDM symbols but greater than five OFDM symbols, a last OFDM symbol of a first slot included in the first subframe does not include a primary synchronization signal and/or a second last OFDM symbol of a first slot included in the first subframe does not include a secondary synchronization signal. Alternatively, the preset rule may be: When the first subframe is a first subframe or a sixth subframe in a radio frame, and the first subframe is located in the DMTC of the carrier on which the first cell is located, and when the downlink data transmission configuration is an extended cyclic prefix, when and only when the data transmission length of the first subframe is less than 10 OFDM symbols or is less than 10 OFDM symbols but greater than four OFDM symbols, a last OFDM symbol of a first slot included in the first subframe does not include a primary synchronization signal and/or a second last OFDM symbol of a first slot included in the first subframe does not include a secondary synchronization signal.

Besides, the preset rule may be: When the downlink data transmission configuration is a normal cyclic prefix, when the first subframe is a first subframe or a sixth subframe in a radio frame, when and only when the data transmission length of the first subframe is less than 12 OFDM symbols, a last OFDM symbol of a first slot included in the first subframe does not include a primary synchronization signal and/or a second last OFDM symbol of a first slot included in the first subframe does not include a secondary synchronization signal. Moreover, considering that when the data transmission length of the first subframe is not greater than five OFDM symbols, the first cell is limited by the data transmission length and therefore cannot send a PSS or an SSS in the first subframe, when the data transmission length of the first subframe is not greater than five OFDM symbols, a DRS-based RRM measurement is not affected, either. Therefore, the preset rule may be: When the first subframe is a first subframe or a sixth subframe in a radio frame, and when the downlink data transmission configuration is a normal cyclic prefix, when and only when the data transmission length of the first subframe is less than 12 OFDM symbols or is less than 12 OFDM symbols but greater than five OFDM symbols, a last OFDM symbol of a first slot included in the first subframe does not include a primary synchronization signal and/or a second last OFDM symbol of a first slot included in the first subframe does not include a secondary synchronization signal. Alternatively, the preset rule may be: When the first subframe is a first subframe or a sixth subframe in a radio frame, and when the downlink data transmission configuration is an extended cyclic prefix, when and only when the data transmission length of the first subframe is less than 10 OFDM symbols or is less than 10 OFDM symbols but greater than four OFDM symbols, a last OFDM symbol of a first slot included in the first subframe does not include a primary synchronization signal and/or a second last OFDM symbol of a first slot included in the first subframe does not include a secondary synchronization signal.

Figure 10:
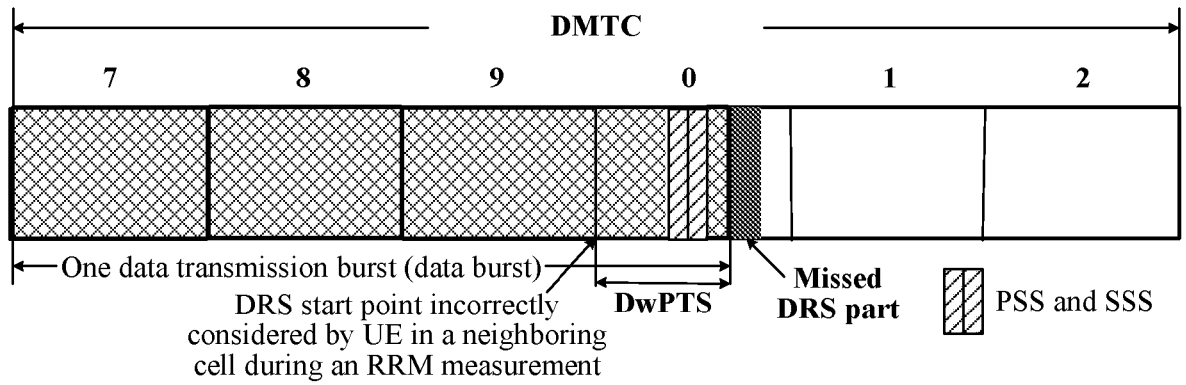
FIG. 10 is a schematic diagram of a DMTC according to an embodiment of the present invention.

FIG. 10 is a schematic diagram of a DMTC according to an embodiment of the present invention. It should be noted that, in this embodiment of the present invention, the DMTC of the carrier on which the first cell is located includes a DMTC configured on the carrier. The DMTC may be understood as a DMTC configured for the first cell, or may be understood as a DMTC configured for a non-first cell. For the user equipment, the DMTC configured on the carrier may correspond to a DMTC of a serving cell of the user equipment, or may correspond to a DMTC of a neighboring cell of the user equipment. The neighboring cell herein refers to another cell except the serving cell, and the neighboring cell and the serving cell are located on a same carrier. It should be noted that, if the DMTC of the carrier on which the first cell is located corresponds to the DMTC of the serving cell of the user equipment, for the user equipment, the user equipment may directly determine a time position of the DMTC based on the DMTC configuration of the serving cell, and determine the data transmission feature of the first subframe based on the preset condition. In another aspect, if the DMTC of the carrier on which the first cell is located corresponds to the DMTC of the neighboring cell of the user equipment, for the user equipment, the user equipment needs to determine the DMTC of the neighboring cell, and then determine the data transmission feature of the first subframe based on the preset condition. A specific manner of determining, by the user equipment, the DMTC of the neighboring cell includes: indicating, by the serving cell of the user equipment or an access network device to which the serving cell belongs, the DMTC of the neighboring cell of the user equipment, or another manner may be used, which is not specifically limited in this embodiment of the present invention. Correspondingly, the serving cell of the user equipment or the access network device to which the serving cell belongs needs to first obtain the DMTC configuration of the neighboring cell of the user equipment. Through interaction, the serving cell and the neighboring cell of the user equipment may obtain the DMTC configuration of each other or obtain the DMTC configuration of one of them. The interaction may be implemented by using a backhaul link such as X2 or S1 signaling, or may be implemented by using radio signaling, or may be implemented in another manner, which is not specifically limited in this embodiment of the present invention. Specifically:

Usually, one DMTC is configured for each carrier. Therefore, generally, for the user equipment, regardless of the serving cell of the user equipment or the neighboring cell of the user equipment, as long as the serving cell and the neighboring cell are located on a same carrier, there is only one DMTC corresponding to the user equipment on the carrier. Using second user equipment in FIG. 4 as an example, for the second user equipment, the first cell is a neighboring cell of the second user equipment, and the third cell is a serving cell of the second user equipment. If the carrier on which the first cell is located is the same as a carrier on which the third cell is located, in this embodiment of the present invention, the DMTC of the carrier on which the first cell is located may be understood as the DMTC of the first cell, and may also be understood as a DMTC of the third cell. The second user equipment detects, in the DMTC of the carrier on which the third cell is located, whether a DRS exists, and if the DRS exists, may measure, by using the detected DRS, a cell including the DRS. For example, if the second user equipment detects a DRS of the first cell in the DMTC of the third cell (which is also the DMTC of the first cell, and is also the DMTC of the carrier on which the first cell is located), the second user equipment may execute an RRM measurement (that is, a neighboring cell measurement) on the first cell by using the detected DRS. In this case, for the first cell, if a last subframe in a data burst (which may correspond to the first subframe in this embodiment of the present invention) is a subframe 0 or a subframe 5, and the subframe is located in the DMTC of the carrier on which the first cell is located (that is, in the DMTC of the third cell), according to the method in this embodiment of the present invention, not sending a PSS and/or an SSS and limiting the downlink data transmission length of the first subframe both can ensure that the second user equipment executes an accurate RRM measurement on the first cell. For user equipment served by the first cell, because the DMTC of the first cell may be learned, a correct assumption may be made on the data transmission feature of the first subframe based on the preset rule.

In another case, the DMTC of the first cell is different from the DMTC of the third cell. In this case, the DMTC of the carrier on which the first cell is located may be understood as the DMTC of the third cell. In this case, to ensure that user equipment served by the third cell can implement a correct RRM measurement on the first cell, a data transmission feature of the first cell in a subframe 0 and/or a subframe 5 may be limited, that is, if the subframe 0 and/or the subframe 5 is a partial subframe, regardless of whether the subframe is located in the DMTC of the carrier on which the first cell is located, the first cell does not send a PSS and/or an SSS in the partial subframe. Further, if a downlink configuration is a normal cyclic prefix, when a downlink data transmission length of the partial subframe is less than 12 OFDM symbols or is less than 12 OFDM symbols but greater than five OFDM symbols, the first cell does not send a PSS and/or an SSS in the partial subframe. The partial subframe herein corresponds to the first subframe in this embodiment of the present invention. Obviously, in this case, the user equipment served by the first cell does not need to learn the DMTC configuration of the third cell. However, if the data transmission feature of the first cell in the first subframe is limited only when the partial subframe (that is, the first subframe) is located in the DMTC of the third cell, the user equipment served by the first cell needs to learn the DMTC of the third cell, and the first cell and the third cell need to learn the DMTC configuration of each other through interaction.

The foregoing description is also applicable to another implementation manner.

In FIG. 10, a last subframe in one burst data transmission (a Data burst in FIG. 10) is the first subframe, and a subframe index number of the last subframe is 0. Because a time length of the first subframe is less than a DRS data transmission length (a DRS data transmission length is 12 OFDM symbols), if a PSS and an SSS are sent in an oblique line part in the figure, DRS misinterpreting is caused. Therefore, in this embodiment, it is limited that a PSS and/or an SSS is not sent in the first subframe. In this case, the user terminal detects no PSS and/or SSS, and the user terminal does not incorrectly consider that the subframe 0 includes a DRS.

In another embodiment of the present invention, if the preset condition is that the first subframe is a first subframe or a sixth subframe in a radio frame, and the first subframe is located in a DMTC of the carrier on which the first cell is located, the data transmission characteristic is that the downlink data transmission length of the first subframe is an element included in a first time set. That is, a preset rule is: When the first subframe is a first subframe or a sixth subframe in a radio frame, and the first subframe is located in the DMTC of the carrier on which the first cell is located, the downlink data transmission length of the first subframe is the element included in the first time set.

In another embodiment of the present invention, if the preset condition is that the first subframe is a first subframe or a sixth subframe in a radio frame, the data transmission characteristic is that the downlink data transmission length of the first subframe is an element included in a first time set. That is, a preset rule is: When the first subframe is a first subframe or a sixth subframe in a radio frame, and the first subframe is located in the DMTC of the carrier on which the first cell is located, the downlink data transmission length of the first subframe is the element included in the first time set.

In an example, when the downlink data transmission configuration of the first cell is a normal cyclic prefix, the element included in the first time set is only: one or more of three OFDM symbols, six OFDM symbols, 12 OFDM symbols, 14 OFDM symbols, or 13 OFDM symbols, and the first time set does not include another element except the one or more of three OFDM symbols, six OFDM symbols, 12 OFDM symbols, 14 OFDM symbols, or 13 OFDM symbols. For example, if the element included in the first time set is: three OFDM symbols and six OFDM symbols, the first time set includes only the two elements, and does not include another element. When the downlink data transmission configuration of the first cell is an extended cyclic prefix, the element included in the first time set is: one or more of three OFDM symbols, five OFDM symbols, 10 OFDM symbols, or 12 OFDM symbols, and the first time set does not include another element except the one or more of three OFDM symbols, five OFDM symbols, 10 OFDM symbols, or 12 OFDM symbols. For example, if the element included in the first time set is: three OFDM symbols and five OFDM symbols, the first time set includes only the two elements, and does not include another element.

As can be seen from that the element included in the first time set makes the first cell incapable of sending a PSS and/or an SSS in the first subframe, or makes the downlink data transmission length of the first cell capable of supporting DRS sending. Therefore, when the downlink data transmission length of the first subframe is the element included in the first time set, a DRS-based RRM measurement is not affected, either.

In still another embodiment of the present invention, if the preset condition is that the first subframe is a first subframe or a sixth subframe in a radio frame, and the first subframe is located in a DMTC of the carrier on which the first cell is located, the data transmission characteristic is that the downlink data transmission length of the first subframe is an element included in a second time set. If the preset condition is that the first subframe is a first subframe or a sixth subframe in a radio frame, and the first subframe is not located in a DMTC of the carrier on which the first cell is located, the data transmission characteristic is that the downlink data transmission length of the first subframe is an element included in a third time set. The second time set includes at least one element different from that in the third time set.

In an example, when the downlink data transmission configuration of the first cell is a normal cyclic prefix, the element included in the second time set is: one or more of three OFDM symbols, six OFDM symbols, 12 OFDM symbols, 14 OFDM symbols, or 13 OFDM symbols, and the element included in the third time set is: one or more of three OFDM symbols, six OFDM symbols, nine OFDM symbols, 10 OFDM symbols, 11 OFDM symbols, 12 OFDM symbols, 14 OFDM symbols, or 13 OFDM symbols. When the downlink data transmission configuration of the first cell is an extended cyclic prefix, the element included in the second time set is: one or more of three OFDM symbols, five OFDM symbols, 10 OFDM symbols, or 12 OFDM symbols, and the element included in the third time set is: one or more of three OFDM symbols, five OFDM symbols, eight OFDM symbols, nine OFDM symbols, 10 OFDM symbols, or 12 OFDM symbols.

It should be noted that, if the first subframe is a first subframe or a sixth subframe in a radio frame, and the first subframe is not located in the DMTC of the carrier on which the first cell is located, a data transmission length of the first subframe may be not limited, that is, the downlink data transmission length of the first subframe may be a time resource occupied by any quantity of OFDM symbols. That is, when the downlink data transmission configuration is a normal cyclic prefix, the data transmission length of the first subframe may be any one of 1 to 14 OFDM symbols; or when the downlink data transmission configuration is an extended cyclic prefix, the data transmission length of the first subframe may be any one of 1 to 12 OFDM symbols. However, in a DwPTS, in a case in which the downlink data transmission configuration is a normal cyclic prefix, a downlink data transmission length of the DwPTS is three OFDM symbols, six OFDM symbols, nine OFDM symbols, 10 OFDM symbols, 11 OFDM symbols, or 12 OFDM symbols; or when the downlink data transmission configuration is an extended cyclic prefix, a downlink data transmission length of the DwPTS is three OFDM symbols, five OFDM symbols, eight OFDM symbols, nine OFDM symbols, or 10 OFDM symbols. Therefore, when the downlink data transmission configuration of the first cell is a normal cyclic prefix, the element included in the third time set is: one or more of three OFDM symbols, six OFDM symbols, nine OFDM symbols, 10 OFDM symbols, 11 OFDM symbols, 12 OFDM symbols, 14 OFDM symbols, or 13 OFDM symbols. When the downlink data transmission configuration of the first cell is an extended cyclic prefix, the element included in the third time set is: one or more of three OFDM symbols, five OFDM symbols, eight OFDM symbols, nine OFDM symbols, 10 OFDM symbols, or 12 OFDM symbols.

As can be seen from that, when the first subframe is not located in the DMTC of the carrier on which the first cell is located, the data transmission length of the first subframe is not limited. This ensures data transmission efficiency, and improves spectrum utilization.

It should be noted that, in an embodiment of the present invention, the preset rule (or the determining, by the user equipment, a data transmission characteristic of the cell in the first subframe based on a preset condition) may further include: If the first subframe is a first subframe (a subframe 0) or a sixth subframe (a subframe 5) in a radio frame, the downlink data transmission length of the first subframe may include: one or more of three OFDM symbols, six OFDM symbols, 12 OFDM symbols, 14 OFDM symbols, or 13 OFDM symbols if the downlink data transmission configuration is a normal cyclic prefix; or one or more of three OFDM symbols, five OFDM symbols, 10 OFDM symbols, or 12 OFDM symbols if the downlink data transmission configuration is an extended cyclic prefix. In this case, when the downlink data transmission configuration is a normal cyclic prefix, only when the downlink data transmission length of the first subframe is 12 or 14 OFDM symbols, the user equipment considers that the first subframe includes a primary synchronization signal PSS and a secondary synchronization signal SSS, at least four OFDM symbols carry a CRS, a last symbol that carries the CRS is a twelfth OFDM symbol in the first subframe, and the PSS is carried in the seventh OFDM symbol in the first subframe. When the downlink data transmission configuration is an extended cyclic prefix, only when the downlink data transmission length of the first subframe is 10 or 12 OFDM symbols, the user equipment considers that the subframe includes a primary synchronization signal PSS and a secondary synchronization signal SSS, at least four OFDM symbols carry a CRS, a last symbol that carries the CRS is a tenth OFDM symbol in the first subframe, and the PS S is carried in the sixth OFDM symbol in the first subframe.

It should be noted that, in an embodiment of the present invention, the preset rule (or the determining, by the user equipment, a data transmission characteristic of the cell in the first subframe based on a preset condition) may further include: If the first subframe is a first subframe (a subframe 0) or a sixth subframe (a subframe 5) in a radio frame, the downlink data transmission length of the first subframe is not limited. The downlink data transmission length of the first subframe may include: one or more of three OFDM symbols, six OFDM symbols, 12 OFDM symbols, 14 OFDM symbols, 13 OFDM symbols, nine OFDM symbols, 10 OFDM symbols, or 11 OFDM symbols if the downlink data transmission configuration is a normal cyclic prefix; or one or more of three OFDM symbols, five OFDM symbols, 10 OFDM symbols, 12 OFDM symbols, eight OFDM symbols, or nine OFDM symbols if the downlink data transmission configuration is an extended cyclic prefix. In this case, when the downlink data transmission configuration is a normal cyclic prefix, when the downlink data transmission length of the first subframe is nine or 10 or 11 OFDM symbols, the first subframe does not include a PSS and/or an SSS, and if there is a PSS, the PSS is carried in the seventh OFDM symbol in the first subframe; or when the downlink data transmission configuration is an extended cyclic prefix, when the downlink data transmission length of the first subframe is eight or nine OFDM symbols, the first subframe does not include a PSS and/or an SSS, and if there is a PSS, the PSS is carried in the sixth OFDM symbol in the first subframe.

It should be noted that, in an embodiment of the present invention, the preset rule (or the determining, by the user equipment, a data transmission characteristic of the cell in the first subframe based on a preset condition) may further include: If the first subframe is located in the DMTC of the carrier on which the first cell is located (a subframe index number of the first subframe may be any integer value in 0 to 9), when the downlink data transmission configuration is a normal cyclic prefix, only when a length of the first subframe is 12 OFDM symbols or 14 OFDM symbols, the user equipment assumes that the first subframe includes a DRS, and when the length of the first subframe is another value except the 12 OFDM symbols and the 14 OFDM symbols, the user equipment does not assume that the first subframe includes a DRS; or when the downlink data transmission configuration is an extended cyclic prefix, only when a length of the first subframe is 10 OFDM symbols or 12 OFDM symbols, the user equipment assumes that the first subframe includes a DRS, and when the length of the first subframe is another value except the 10 OFDM symbols and the 12 OFDM symbols, the user equipment does not assume that the first subframe includes a DRS.

In an embodiment of the present invention, the determining, by the user equipment, a data transmission characteristic of the first cell in the first subframe based on a preset condition includes: When a time resource of a CSI-RS and/or a CSI-IM of the user equipment overlaps the first subframe, the first subframe includes the CSI-RS and/or the CSI-IM of the user equipment. The CSI-RS and/or the CSI-IM of the user equipment is periodically configured. However, for user equipment in an LTE system release 12, CSI-RS and CSI-IM transmission is not supported in a DwPTS. In this embodiment, the CSI-RS and CSI-IM transmission is supported, and a channel state information measurement and a channel state interference information measurement are implemented.

It should be noted that, in this embodiment of the present invention, the data transmission length of the first subframe may include 14 OFDM symbols if the first threshold corresponds to a value greater than 1 ms.

It should be noted that, in this embodiment of the present invention, in a radio frame, a first subframe is a subframe whose subframe index number is 0 and a sixth subframe is a subframe whose subframe index number is 5. When the first subframe is the subframe whose subframe index number is 0, the first slot included in the first subframe is a slot whose slot index number is 0. When the first subframe is the subframe whose subframe index number is 5, the first slot included in the first subframe is a slot whose slot index number is 10.

It should be noted that, in this embodiment of the present invention, the first threshold, the preset condition, the data transmission characteristic, the element included in the first time set, the element included in the second time set, and the element included in the third time set may be pre-configured, for example, may be pre-configured based on a standard protocol specification, or may be set before delivery of the access network device and the user equipment, or may be notified by using higher layer signaling such as radio resource control (RRC) signaling, or may be notified by using physical layer signaling. Specific implementation manners are not limited. If the first subframe is a first subframe (that is, a subframe 0) or a sixth subframe (that is, a subframe 5) in a radio frame, and the first subframe is located in the DMTC of the carrier on which the first cell is located, the data transmission characteristic is that a last OFDM symbol of a first slot included in the first subframe does not include a primary synchronization signal and/or a second last OFDM symbol of a first slot included in the first subframe does not include a secondary synchronization signal.

Figure 11:
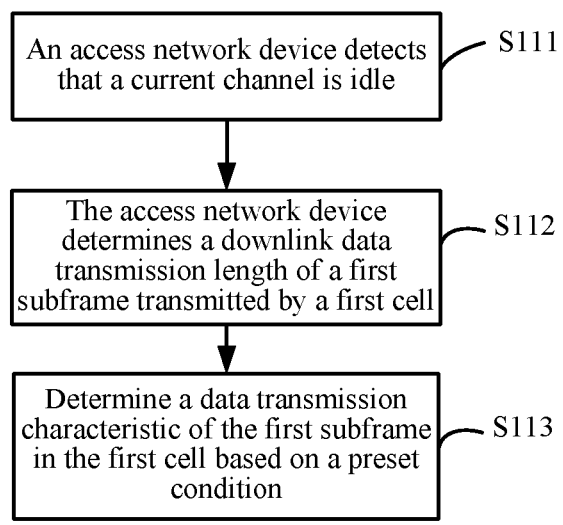
FIG. 11 is a flowchart of a data sending method according to an embodiment of the present invention.

FIG. 11 is a flowchart of a data sending method based on an embodiment of the present invention.

S111: An access network device detects whether a current channel is idle, and if it is detected, within a period of time, that the channel is idle, continues to perform step 112. Step 111 is an optional step.

Specifically, when a wireless communications system occupies an unlicensed frequency band for communication, a detect before send (LBT) rule needs to be used. Whether a channel has been occupied may be detected by using a clear channel assessment (CCA).

S112: The access network device determines a downlink data transmission length of a first subframe transmitted by a first cell, where the downlink data transmission length of the first subframe is less than a first threshold.

Exemplarily, a data transmission start position of the first subframe is on a subframe boundary, and the first subframe is a last subframe in one burst data transmission, referring to FIG. 6. In FIG. 6, the first subframe is a last subframe (a fifth subframe) in one burst data transmission when the first cell transmits data on a working carrier of the first cell.

In an embodiment of the present invention, step 112 further includes: sending, by the access network device, control information, where the control information indicates that the downlink data transmission length of the first subframe is less than the first threshold. It should be noted that, in this embodiment of the present invention, the sending, by the access network device, control information may include: sending, by a cell served by the access network device, the control information. The access network device herein may be a base station, for example, a first access network device in FIG. 4. Sending, by the first access network device, the control information may be understood as sending, by the first cell or a second cell, the control information.

In an example, a subframe that carries the control information is any subframe that is included in the first cell and that is in a transmission burst, referring to FIG. 6; or may be any subframe in the second cell. More specifically, the subframe that carries the control information may be any subframe within a time range, corresponding to a data burst of the first cell, of the second cell. The second cell and the first cell are jointly used through CA or DC. Preferably, a carrier on which the second cell is located and a working frequency range of the second cell belong to a frequency resource included in a licensed frequency band. For the time range, corresponding to the data burst of the first cell, of the second cell, refer to FIG. 7. That is, the control information may be sent by using the first cell, or may be sent by using the second cell. That is, the control information may be carried by using time and frequency resources included in a service data channel of the first cell or time and frequency resources included in a control data channel of the first cell, or may be carried by using time and frequency resources included in a service data channel of the second cell or time and frequency resources included in a control data channel of the second cell. The control information may be UE specific control information, or may be cell specific control information. Particularly, when the control information is UE specific control information, the control information may be carried in downlink data scheduling signaling for scheduling the UE.

The control data channel is one or more of control data channels supported by an LTE system, such as a PDCCH, a PCFICH, a PHICH, an EPDCCH, and a PBCH.

The service data channel is one or more of service data channels supported by the LTE system, such as a PDSCH and a PMCH.

It should be noted that, in this embodiment of the present invention, the control information indicates that downlink data transmission of the first subframe is less than the first threshold. When the first threshold is 1 ms, the control information may directly indicate that a target subframe is the first subframe (or a partial subframe), or may directly indicate a data transmission length of a target subframe. The target subframe herein may be any subframe in a data transmission burst of the first cell, for example, any one of a first/second/third/fourth/fifth subframe in FIG. 6. Alternatively, the target subframe may be any subframe on a carrier on which the first cell is located, and in this case, in the target subframe, the first cell may preempt an unlicensed frequency band resource, or may preempt no unlicensed frequency band resource. When the first threshold is greater than 1 ms, the control information may indicate whether the target subframe is a subframe in a data transmission burst of the first cell. Explanation of a data transmission burst is the same as above, and details are not described.

In another embodiment of the present invention, step 112 further includes: indicating, by the access network device by using a reference signal including a reference sequence, that the downlink data transmission length of the first subframe is less than the first threshold.

Specifically, the access network device may send the reference signal including a reference sequence in any subframe in one burst data transmission including the first subframe, to indicate that the downlink data transmission length of the first subframe is less than the first threshold.

Preferably, the access network device adds the reference signal including a reference sequence to a third OFDM symbol in one burst data transmission including the first subframe, to indicate that the downlink data transmission length of the first subframe is less than the first threshold. Further, the access network device adds a primary synchronization signal (PSS) to a third OFDM symbol in one burst data transmission including the first subframe, to indicate that the downlink data transmission length of the first subframe is less than the first threshold. That is, the access network device adds the PSS to a third OFDM symbol in the target subframe, to indicate that the target subframe is the first subframe.

The reference sequence may include but is not limited to the following sequences: a constant amplitude zero auto correlation (CAZAC) sequence, a binary sequence, an m sequence, a pseudo-random sequence, and a ZC sequence.

In still another embodiment of the present invention, the access network device sends pre-configuration information, and the pre-configuration information indicates a longest time within which the first cell transmits data on a carrier on which the first cell is located. The longest data transmission time refers to a maximum time range of one burst data transmission of the first cell on the carrier on which the first cell is located. For example, in Japan, for use of an unlicensed frequency band, it is clearly defined in a regulation that a maximum data transmission time is 4 ms. In addition, in Europe, for use of an unlicensed frequency band, it is clearly defined in a regulation that a maximum data transmission time is 10 ms or 13 ms or 8 ms. Referring to FIG. 7, FIG. 7 is a schematic diagram of determining a first subframe based on pre-configuration information.

Specifically, the access network device configures, for user equipment by using higher layer signaling, the pre-configuration information indicating the longest data transmission time, for example, indicates the pre-configuration information to the user equipment by using radio resource control (RRC) signaling.

In an example, when a downlink data transmission configuration of the first cell is a normal cyclic prefix, the first threshold is 14 OFDM symbols or 1 ms (millisecond); and in this case, a complete subframe includes 14 OFDM symbols, or a time resource occupied by a complete subframe is 1 millisecond (1 ms). When a downlink data transmission configuration of the first cell is an extended cyclic prefix, the first threshold is 12 OFDM symbols or 1 ms; and in this case, a complete subframe includes 12 OFDM symbols, or a time resource occupied by a complete subframe is 1 millisecond (1 ms). Therefore, when the downlink data transmission configuration of the first cell is a normal cyclic prefix, and the first threshold is 14 OFDM symbols or 1 ms, or when the downlink data transmission configuration of the first cell is an extended cyclic prefix, and the first threshold is 12 OFDM symbols or 1 ms, the first subframe is an incomplete subframe, that is, a partial subframe, because the downlink data transmission length of the first subframe is less than the first threshold. It should be noted that the first threshold may be a value greater than 1 ms; and in this case, the first subframe may be a complete subframe, or may be a partial subframe.

S113: The access network device determines a data transmission characteristic of the first subframe in the first cell based on a preset condition, so that the access network device sends, based on the data transmission characteristic, data including the first subframe.

In an embodiment of the present invention, if the preset condition is that the first subframe is a first subframe (that is, a subframe 0) or a sixth subframe (that is, a subframe 5) in a radio frame, and the first subframe is located in a DMTC of the carrier on which the first cell is located, the data transmission characteristic is that a last OFDM symbol of a first slot included in the first subframe does not include a primary synchronization signal and/or a second last OFDM symbol of a first slot included in the first subframe does not include a secondary synchronization signal. That is, the determining, by the access network device, a data transmission characteristic of the first subframe in the first cell according to a preset condition includes: When the first subframe is a first subframe or a sixth subframe in a radio frame, and the first subframe is located in the DMTC of the carrier on which the first cell is located, a last OFDM symbol of a first slot included in the first subframe does not include a primary synchronization signal and/or a second last OFDM symbol of a first slot included in the first subframe does not include a secondary synchronization signal.

In an embodiment of the present invention, if the preset condition is that the first subframe is a first subframe (that is, a subframe 0) or a sixth subframe (that is, a subframe 5) in a radio frame, the data transmission characteristic is that a last OFDM symbol of a first slot included in the first subframe does not include a primary synchronization signal and/or a second last OFDM symbol of a first slot included in the first subframe does not include a secondary synchronization signal. That is, when the first subframe is a first subframe or a sixth subframe in a radio frame, and the first subframe is located in a DMTC of the carrier on which the first cell is located, a last OFDM symbol of a first slot included in the first subframe does not include a primary synchronization signal and/or a second last OFDM symbol of a first slot included in the first subframe does not include a secondary synchronization signal.

As can be seen from that, if the downlink data transmission configuration is a normal cyclic prefix, the last OFDM symbol of the first slot refers to a seventh OFDM symbol of the first slot, which is also a seventh OFDM symbol included in the first subframe, and the second last OFDM symbol of the first slot refers to a sixth OFDM symbol of the first slot, which is also a sixth OFDM symbol included in the first subframe. If the downlink data transmission configuration is an extended cyclic prefix, the last OFDM symbol of the first slot refers to a sixth OFDM symbol of the first slot, which is also a sixth OFDM symbol included in the first subframe, and the second last OFDM symbol of the first slot refers to a fifth OFDM symbol of the first slot, which is also a fifth OFDM symbol included in the first subframe. A process of analysis for a case in which the downlink data transmission configuration is an extended cyclic prefix is the same as above, and details are not described herein.

Besides, when the first subframe is a partial subframe, to reduce complexity, for data transmission of the first subframe, reference may be made to a data resource mapping manner supported by a downlink pilot timeslot (DwPTS). The DwPTS is a structure in time division duplexing (TDD) and LTE systems, and the DwPTS is included in a special subframe. A frame structure in an existing TDD LTE system includes a downlink subframe, a special subframe, and an uplink subframe, as shown in FIG. 9.

With reference to a quantity of OFDM symbols supported by the DwPTS, when the downlink data transmission configuration is a normal cyclic prefix, the downlink data transmission length of the first subframe is less than 12 OFDM symbols. Further, the downlink data transmission length of the first subframe is less than 12 OFDM symbols but greater than five OFDM symbols. When the downlink data transmission configuration is an extended cyclic prefix, the downlink data transmission length of the first subframe is less than 10 OFDM symbols, or the downlink data length of the first subframe is less than 10 OFDM symbols but greater than four OFDM symbols.

Besides, considering that when the downlink data transmission configuration is a normal cyclic prefix, a DRS includes 12 OFDM symbols in time, if a data transmission length of the first subframe is less than 12 OFDM symbols, the length is not sufficient to support DRS sending. Therefore, a preset rule may be: When the first subframe is a first subframe or a sixth subframe in a radio frame, and the first subframe is located in the DMTC of the carrier on which the first cell is located, when and only when the data transmission length of the first subframe is less than 12 OFDM symbols, a last OFDM symbol of a first slot included in the first subframe does not include a primary synchronization signal and/or a second last OFDM symbol of a first slot included in the first subframe does not include a secondary synchronization signal. Moreover, considering that when the data transmission length of the first subframe is not greater than five OFDM symbols, the first cell is limited by the data transmission length and therefore cannot send a PSS or an SSS in the first subframe, when the data transmission length of the first subframe is not greater than five OFDM symbols, a DRS-based RRM measurement is not affected, either. Therefore, the preset rule may further be: When the first subframe is a first subframe or a sixth subframe in a radio frame, and the first subframe is located in the DMTC of the carrier on which the first cell is located, when and only when the data transmission length of the first subframe is less than 12 OFDM symbols but greater than five OFDM symbols, a last OFDM symbol of a first slot included in the first subframe does not include a primary synchronization signal and/or a second last OFDM symbol of a first slot included in the first subframe does not include a secondary synchronization signal. When the downlink data transmission configuration is an extended cyclic prefix, the preset rule may further be: When the first subframe is a first subframe or a sixth subframe in a radio frame, and the first subframe is located in the DMTC of the carrier on which the first cell is located, when and only when the data transmission length of the first subframe is less than 10 OFDM symbols or is less than 10 OFDM symbols but greater than four OFDM symbols, a last OFDM symbol of a first slot included in the first subframe does not include a primary synchronization signal and/or a second last OFDM symbol of a first slot included in the first subframe does not include a secondary synchronization signal.

In another embodiment of the present invention, the preset rule may further be: When the first subframe is a first subframe or a sixth subframe in a radio frame, when and only when the data transmission length of the first subframe is less than 12 OFDM symbols or is less than 12 OFDM symbols but greater than 5 OFDM symbols, a last OFDM symbol of a first slot included in the first subframe does not include a primary synchronization signal and/or a second last OFDM symbol of a first slot included in the first subframe does not include a secondary synchronization signal. When the downlink data transmission configuration is an extended cyclic prefix, the preset rule may further be: When the first subframe is a first subframe or a sixth subframe in a radio frame, when and only when the data transmission length of the first subframe is less than 10 OFDM symbols or is less than 10 OFDM symbols but greater than four OFDM symbols, a last OFDM symbol of a first slot included in the first subframe does not include a primary synchronization signal and/or a second last OFDM symbol of a first slot included in the first subframe does not include a secondary synchronization signal.

In another embodiment of the present invention, if the preset condition is that the first subframe is a first subframe or a sixth subframe in a radio frame, and the first subframe is located in a DMTC of the carrier on which the first cell is located, the data transmission characteristic is that the downlink data transmission length of the first subframe is an element included in a first time set. That is, a preset rule is: When the first subframe is a first subframe or a sixth subframe in a radio frame, and the first subframe is located in the DMTC of the carrier on which the first cell is located, the downlink data transmission length of the first subframe is the element included in the first time set.

In another embodiment of the present invention, if the preset condition is that the first subframe is a first subframe or a sixth subframe in a radio frame, the data transmission characteristic is that the downlink data transmission length of the first subframe is an element included in a first time set. That is, a preset rule is: When the first subframe is a first subframe or a sixth subframe in a radio frame, and the first subframe is located in the DMTC of the carrier on which the first cell is located, the downlink data transmission length of the first subframe is the element included in the first time set.

In an example, when the downlink data transmission configuration of the first cell is a normal cyclic prefix, the element included in the first time set is only: one or more of three OFDM symbols, six OFDM symbols, 12 OFDM symbols, 14 OFDM symbols, or 13 OFDM symbols, and the first time set does not include another element except the one or more of three OFDM symbols, six OFDM symbols, 12 OFDM symbols, 14 OFDM symbols, or 13 OFDM symbols. For example, if the element included in the first time set is: three OFDM symbols and six OFDM symbols, the first time set includes only the two elements, and does not include another element. When the downlink data transmission configuration of the first cell is an extended cyclic prefix, the element included in the first time set is: one or more of three OFDM symbols, five OFDM symbols, 10 OFDM symbols, or 12 OFDM symbols, and the first time set does not include another element except the one or more of three OFDM symbols, five OFDM symbols, 10 OFDM symbols, or 12 OFDM symbols. For example, if the element included in the first time set is: three OFDM symbols and five OFDM symbols, the first time set includes only the two elements, and does not include another element.

As can be seen from that the element included in the first time set makes the first cell incapable of sending a PSS and/or an SSS in the first subframe. Therefore, when the downlink data transmission length of the first subframe is the element included in the first time set, a DRS-based RRM measurement is not affected, either.

In still another embodiment of the present invention, if the preset condition is that the first subframe is a first subframe or a sixth subframe in a radio frame, and the first subframe is located in a DMTC of the carrier on which the first cell is located, the data transmission characteristic is that the downlink data transmission length of the first subframe is an element included in a second time set. If the preset condition is that the first subframe is a first subframe or a sixth subframe in a radio frame, and the first subframe is not located in a DMTC of the carrier on which the first cell is located, the data transmission characteristic is that the downlink data transmission length of the first subframe is an element included in a third time set. The second time set includes at least one element different from that in the third time set.

In an example, when the downlink data transmission configuration of the first cell is a normal cyclic prefix, the element included in the second time set is: one or more of three OFDM symbols, six OFDM symbols, 12 OFDM symbols, 14 OFDM symbols, or 13 OFDM symbols, and the element included in the third time set is: one or more of three OFDM symbols, six OFDM symbols, nine OFDM symbols, 10 OFDM symbols, 11 OFDM symbols, 12 OFDM symbols, 14 OFDM symbols, or 13 OFDM symbols. When the downlink data transmission configuration of the first cell is an extended cyclic prefix, the element included in the second time set is: one or more of three OFDM symbols, five OFDM symbols, 10 OFDM symbols, or 12 OFDM symbols, and the element included in the third time set is: one or more of three OFDM symbols, five OFDM symbols, eight OFDM symbols, nine OFDM symbols, 10 OFDM symbols, or 12 OFDM symbols.

It should be noted that, if the first subframe is a first subframe or a sixth subframe in a radio frame, and the first subframe is not located in the DMTC of the carrier on which the first cell is located, a data transmission length of the first subframe may be not limited, that is, the downlink data transmission length of the first subframe may be a time resource occupied by any quantity of OFDM symbols. That is, when the downlink data transmission configuration is a normal cyclic prefix, the data transmission length of the first subframe may be any one of 1 to 14 OFDM symbols, which is not limited herein; or when the downlink data transmission configuration is an extended cyclic prefix, the data transmission length of the first subframe may be any one of 1 to 12 OFDM symbols. However, in a DwPTS, in a case in which the downlink data transmission configuration is a normal cyclic prefix, a downlink data transmission length of the DwPTS is three OFDM symbols, six OFDM symbols, nine OFDM symbols, 10 OFDM symbols, 11 OFDM symbols, or 12 OFDM symbols; or when the downlink data transmission configuration is an extended cyclic prefix, a downlink data transmission length of the DwPTS is three OFDM symbols, five OFDM symbols, eight OFDM symbols, nine OFDM symbols, or 10 OFDM symbols. Therefore, when the downlink data transmission configuration of the first cell is a normal cyclic prefix, the element included in the third time set is: one or more of three OFDM symbols, six OFDM symbols, nine OFDM symbols, 10 OFDM symbols, 11 OFDM symbols, 12 OFDM symbols, 14 OFDM symbols, or 13 OFDM symbols; or when the downlink data transmission configuration of the first cell is an extended cyclic prefix, the element included in the third time set is: one or more of three OFDM symbols, five OFDM symbols, eight OFDM symbols, nine OFDM symbols, 10 OFDM symbols, or 12 OFDM symbols.

As can be seen from that, when the first subframe is not located in the DMTC of the carrier on which the first cell is located, the data transmission length of the first subframe is not limited. This ensures data transmission efficiency, and improves spectrum utilization.

It should be noted that, in this embodiment of the present invention, the determining, by the access network device, a downlink data transmission length of a first subframe transmitted by a first cell may be understood as determining, by the access network device, a downlink data transmission length of transmission of the first cell in the first subframe. The access network device may determine the downlink data transmission length of the first subframe based on service load, a time position of a resource preempted on an unlicensed frequency band, and a maximum time of one burst data transmission on the unlicensed frequency band, or may determine the downlink data transmission length of the first subframe in another manner, which is not limited herein.

In an embodiment of the present invention, the determining, by the access network device, a data transmission characteristic of the first cell in the first subframe based on a preset condition includes: when the first subframe includes a CSI-RS and/or a CSI-IM, sending the first subframe including the CSI-RS and/or the CSI-IM. The CSI-RS and/or the CSI-IM is periodically configured.

It should be noted that, in this embodiment of the present invention, the data transmission length of the first subframe may include 14 OFDM symbols if the first threshold corresponds to a value greater than 1 ms.

It should be noted that, in this embodiment of the present invention, the first threshold, the preset condition, the data transmission characteristic, the element included in the first time set, the element included in the second time set, and the element included in the third time set may be pre-configured, for example, may be pre-configured based on a standard protocol specification, or may be set before delivery of the access network device and the user equipment, or may be notified by using higher layer signaling such as radio resource control (RRC) signaling, or may be notified by using physical layer signaling. Specific implementation manners are not limited.

Figure 12:
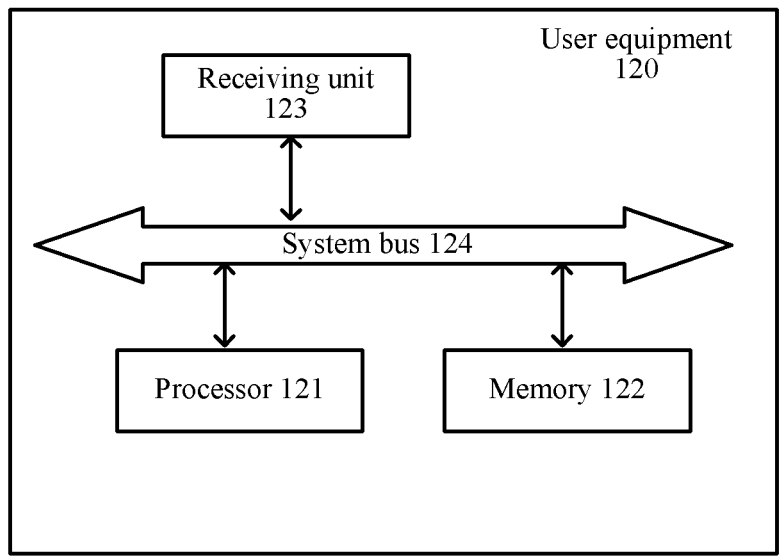
FIG. 12 is a schematic diagram of user equipment according to an embodiment of the present invention.

FIG. 12 is a schematic diagram of user equipment according to an embodiment of the present invention. The user equipment may be a communications terminal, for example, a terminal device such as a mobile phone, a tablet computer, a notebook computer, a ultra-mobile personal computer (UMPC), a netbook, or a personal digital assistant (PDA), or may be a relay.

A person skilled in the art may understand that a structure of the user equipment shown in FIG. 12 does not limit the user equipment, and more or fewer components than those shown in the figure may be included, or some components may be combined, or a different component deployment may be used.

In FIG. 12, the user equipment 120 includes a processor 121, a memory 122, a receiving unit 123, and a system bus 124. Communication and connection between the processor 121, the memory 122, and the receiving unit 123 are implemented by using the system bus 124.

The processor 121 may be a general-purpose central processing unit (CPU), a micro processor, an application-specific integrated circuit (ASIC), or one or more integrated circuits, and is configured to execute a related program.

The processor 121 is configured to: determine first information of a first cell, and determine a first subframe based on the first information, where a downlink data transmission length of the first subframe is less than a first threshold. The processor 121 is further configured to determine a data transmission characteristic of the first cell in the first subframe based on a preset condition.

The memory 122 may be a read only memory (ROM), a static storage device, a dynamic device, or a random access memory (RAM). The memory 122 may store an operating system and another application program. When the technical solutions provided in the embodiments of the present invention are implemented by using software or firmware, program code used to implement any optional technical solution provided in the foregoing method embodiments of the present invention is stored in the memory 122 and executed by the processor 121.

The receiving unit 123 obtains, from a radio channel (for example, a service data channel or a control data channel), data including the first subframe.

The system bus 124 may include a channel, to transfer information between the components of the equipment 120 (for example, the processor 121, the memory 122, and the receiving unit 123).

Functions of the processor 121 are described below in detail.

In an example, the processor 121 detects the first information in the first cell. Further, the processor 121 detects the first information on a working carrier or carrier frequency of the first cell, where the working carrier of the first cell belongs to an unlicensed frequency band. That is, the processor 121 detects the first information on a target carrier, where the target frequency band is a frequency band on which the first cell is located. That the target frequency band is a frequency band on which the first cell is located refers to that the first cell may transmit data by using the target frequency band.

For example, if the working carrier frequency of the first cell is F1, the processor 121 detects the first information on a frequency resource corresponding to the working carrier frequency F1. The frequency resource may be represented by a center frequency of the frequency resource and a size of the frequency resource. The working carrier of the first cell (which may also be referred to as a carrier on which the first cell is located) may be configured by an access network device (for example, a base station) in the first cell for the user terminal. After the processor 121 obtains the configured working carrier of the first cell, the processor 121 detects the first information on the carrier.

Preferably, the first information carries identity information of the first cell. For example, the first information carries a cell identification (Cell ID) of the first cell, so that the user equipment can determine whether the first information detected by the user equipment belongs to the first cell.

It should be noted that the first cell may include a serving cell of the user equipment, and may further include a neighboring cell of the serving cell of the user equipment (for example, the third cell in FIG. 4). The serving cell and the neighboring cell may be located on a same carrier or different carriers.

In an embodiment of the present invention, the first information is control information, and the processor 121 detects the control information on a control data channel and/or a service data channel of the first cell, or the processor 121 detects the control information on a control data channel and/or a service data channel of a second cell, where the first cell is a serving cell of the user equipment, for example, a secondary cell, and the second cell is also a serving cell of the user equipment, for example, a primary cell. A carrier on which the second cell is located is different from the carrier on which the first cell is located. The first cell and the second cell may jointly provide a data service to the user equipment through CA or DC. Correspondingly, if the processor 121 detects the control information by using the control data channel and/or the service data channel of the second cell, to determine the first subframe, and the first subframe is a subframe in the first cell, it may be considered that the second cell indicates the first subframe by using a cross-carrier indication. If the processor 121 detects the control information by using the control data channel and/or the service data channel of the first cell, to determine the first subframe, it may be considered that the first cell indicates the first subframe by using an intra-carrier indication.

The control data channel of the first cell (or the second cell) is one or more of control data channels supported by an LTE system, such as a physical downlink control channel (PDCCH), a physical control format indicator channel (PCFICH), a physical hybrid automatic repeat request indicator channel (PHICH), an enhanced physical downlink control channel (EPDCCH), and a physical broadcast channel (PBCH).

The service data channel of the first cell (or the second cell) is one or more of service data channels supported by the LTE system, such as a physical downlink shared channel (PDSCH) and a physical multicast channel (PMCH).

In an example, a subframe that carries the control information is any subframe that is included in the first cell and that is in one burst data transmission, referring to FIG. 6; or may be any subframe in the second cell. More specifically, the burst data transmission may be any subframe within a time range, corresponding to one burst data transmission of the first cell, of the second cell. The second cell and the first cell are jointly used through CA or DC. Preferably, the carrier on which the second cell is located and a working frequency range of the second cell belong to a frequency resource included in a licensed frequency band. For the working frequency range of the second cell and the time range, corresponding to the burst data transmission of the first cell, of the second cell, refer to FIG. 7. That is, the control information may be sent by using the first cell, or may be sent by using the second cell. That is, the control information may be carried by using time and frequency resources included in the service data channel of the first cell or time and frequency resources included in the control data channel of the first cell, or may be carried by using time and frequency resources included in the service data channel of the second cell or time and frequency resources included in the control data channel of the second cell. The control information may be UE specific control information, or may be cell specific control information. Particularly, when the control information is UE specific control information, the control information may be carried in downlink data scheduling signaling for scheduling the UE.

It should be noted that, in this embodiment of the present invention, the control information indicates that downlink data transmission of the first subframe is less than the first threshold. When the first threshold is 1 ms, the control information directly indicates that a target subframe is the first subframe (for example, a partial subframe). Alternatively, the control information may directly indicate a data transmission length of a target subframe, and in this case, the processor 121 determines, based on a correspondence between the data transmission length of the target subframe and the first threshold, whether the target subframe is the first subframe (or the partial subframe). The target subframe herein may be any subframe in one burst data transmission of the first cell, for example, any one of a first/second/third/fourth/fifth subframe in FIG. 6. Alternatively, the target subframe may be any subframe on the carrier on which the first cell is located. When the first threshold is greater than 1 ms, the control information may indicate whether the target subframe is a subframe in one burst data transmission of the first cell. Explanation of one burst data transmission is the same as above, and details are not described.

In another embodiment of the present invention, the first information is a reference signal including a reference sequence.

Specifically, the processor 121 detects, in each subframe included in one burst data transmission of the first cell, whether there is a reference signal including a reference sequence, where the first cell may include a serving cell of the user equipment. Besides, the processor 121 may further detect, in each subframe included in a second cell, whether there is a reference signal including a reference sequence, to determine whether a subframe, corresponding to the subframe, of the first cell is the first subframe. Herein, the subframe, corresponding to the subframe, of the first cell may include a subframe having a same subframe index number as the subframe, or a subframe having a fixed subframe offset.

Preferably, the processor 121 performs detection on a third OFDM symbol in each subframe in one burst data transmission of the first cell, to detect whether there is a reference signal including a reference sequence in the third OFDM symbol. Further, the processor 121 detects, in a third OFDM symbol in each subframe included in one burst data transmission, whether there is a primary synchronization signal (PSS). That is, if the processor 121 detects a PSS in a third OFDM symbol in a target subframe, the processor 121 may determine that the target subframe is the first subframe (or a partial subframe). Otherwise, the processor 121 may determine that the target subframe is a complete subframe. The target subframe herein is any subframe in one burst data transmission. Besides, because a CRS carries the identity information of the first cell, the processor 121 may determine, by detecting the CRS, whether the target subframe is the first subframe. That is, after the processor 121 detects the CRS, the processor 121 may determine that a subframe including the CRS is the first subframe. In other words, if the CRS is detected, it indicates that the first cell has preempted an unlicensed frequency band resource including the carrier on which the first cell is located.

In this embodiment of the present invention, for a method for identifying, by the processor 121, one burst data transmission of the first cell on the carrier on which the first cell is located, a control information detection method or a reference signal detection method may be used. This is not limited herein. After determining one burst data transmission, the user equipment may determine the target subframe.

The reference sequence may include but is not limited to the following sequences: a CAZAC sequence, a binary sequence, an m sequence, a pseudo-random sequence, and a ZC sequence.

It should be noted that the reference sequence may correspond to different data transmission lengths of the target subframe, where explanation of the target subframe is the same as above. That is, in this embodiment of the present invention, the target subframe may include one subframe in one burst data transmission of the first cell on the carrier on which the first cell is located, or may be any subframe on the carrier on which the first cell is located.

In still another embodiment of the present invention, the first information is pre-configuration information, and the pre-configuration information indicates a longest time within which the first cell transmits data on the carrier on which the first cell is located. The longest data transmission time refers to a maximum time range of one burst data transmission of the first cell on the carrier on which the first cell is located. For example, in Japan, for use of an unlicensed frequency band, it is clearly defined in a regulation that a maximum data transmission time is 4 ms. In addition, in Europe, for use of an unlicensed frequency band, it is clearly defined in a regulation that a maximum data transmission time is 10 ms or 13 ms or 8 ms. Refer to FIG. 8. In FIG. 8, the user equipment may first determine a start position of one burst data transmission, which may be implemented by detecting control information, detecting a reference sequence, or the like, which is not specifically limited in this embodiment of the present invention. In FIG. 8, the processor 121 detects a CRS and determines a start position of one burst data transmission, and then obtains a position of a partial subframe, that is, a fifth subframe marked in FIG. 8, through calculation based on the pre-configuration information, to determine the first subframe.

Besides, the pre-configuration information may be a standard protocol specification, or may be configured for the user terminal by the access network device in the first cell (for example, an LTE base station) by using higher layer signaling, for example, indicated to the user terminal by using radio resource control (RRC) signaling.

In an example, when a downlink data transmission configuration of the first cell is a normal cyclic prefix, the first threshold is 14 OFDM symbols or 1 ms (millisecond); and in this case, a complete subframe includes 14 OFDM symbols, or a time resource occupied by a complete subframe is 1 millisecond (1 ms). When a downlink data transmission configuration of the first cell is an extended cyclic prefix, the first threshold is 12 OFDM symbols or 1 ms; and in this case, a complete subframe includes 12 OFDM symbols, or a time resource occupied by a complete subframe is 1 millisecond (1 ms).

It should be noted that the first threshold may be greater than 1 ms; and in this case, the first subframe may include a complete subframe, or may include a partial subframe (that is, a subframe whose length in downlink data transmission is less than 1 ms).

In an embodiment of the present invention, the processor 121 determines the first subframe based on the control information, and the control information indicates that the downlink data transmission length of the first subframe is less than the first threshold. In other words, the processor 121 determines the partial subframe based on the control information, which includes determining a time position of the partial subframe.

Besides, the control information may indicate that a particular subframe is the first subframe (or the partial subframe), where the particular subframe may be a subframe carrying the control information, or may be a subframe indicated by the control information. The subframe indicated by the control information may be represented by a subframe index number, or may be represented by a subframe after the subframe including the control information, where a given time interval exists between the subframe and the subframe including the control information, and the time interval may be represented by an integer quantity of OFDM symbols or an integer quantity of slots or an integer quantity of Tss. A Ts corresponds to a reciprocal of a sampling rate used for data transmission in an LTE system. For example, in the LTE system, a length corresponding to 307200 Tss is one radio frame, that is, 10 ms, and a length corresponding to 15360 Tss is half a subframe (one slot), that is, 0.5 ms, as shown in FIG. 6.

In FIG. 6, the first subframe is a last subframe in one burst data transmission (the fifth subframe in FIG. 6) when the first cell transmits data on the working carrier of the first cell (that is, the carrier on which the first cell is located). The control information may be carried in the last subframe, to indicate that a current subframe is the first subframe, or the control information may be carried in any subframe in one burst data transmission, for example, a second subframe, a third subframe, or a fourth subframe included in the burst data transmission, to indicate that a last subframe is the first subframe. It should be noted that, in FIG. 6, a data transmission length of a first subframe included in the burst data transmission is less than 1 ms. Although the first subframe is a partial subframe, the first subframe is not the first subframe determined based on the first information. In this embodiment of the present invention, the first subframe is the last subframe in the burst data transmission in FIG. 6, that is, the fifth subframe in FIG. 6. As can be seen from that a data transmission start position included in the first subframe is on a subframe boundary. A data transmission start position included in the first subframe is not on a subframe boundary. Therefore, the first subframe in FIG. 6 is not the first subframe.

Besides, the subframe carrying the control information may be any subframe in one burst data transmission of the first cell, or may be any subframe in the second cell. The second cell is the same as that described above, and the second cell and the first cell may jointly provide a data service to the user equipment through CA or DC or the like.

In still another embodiment of the present invention, the processor 121 determines the first subframe based on the pre-configuration information, and the pre-configuration information indicates the longest time within which the first cell transmits data on the carrier on which the first cell is located. The first subframe is a last subframe in the data transmission, and the processor 121 determines the first subframe based on the pre-configuration information.

Preferably, the user terminal obtains a position of the first subframe based on the pre-configuration information by determining a start position of one burst data transmission. Specifically, the processor 121 determines, through blind cell-specific reference signal (CRS) detection in each subframe included in the first cell, whether the first cell has preempted an unlicensed frequency band resource in the currently detected subframe. Once the processor detects a CRS, the processor determines that the first cell has preempted an unlicensed frequency band resource in the currently detected subframe. In this case, the processor 121 uses a position of the currently detected CRS as a start position of one burst data transmission, and then determines, based on the pre-configuration information (that is, a configured longest data transmission time), a position of a last subframe included in the burst data transmission, to determine the first subframe.

In an embodiment of the present invention, if the preset condition is that the first subframe is a first subframe (that is, a subframe 0) or a sixth subframe (that is, a subframe 5) in a radio frame, and the first subframe is located in a discovery signals measurement timing configuration (DMTC) of the carrier on which the first cell is located, the data transmission characteristic is that a last OFDM symbol of a first slot included in the first subframe does not include a primary synchronization signal and/or a second last OFDM symbol of a first slot included in the first subframe does not include a secondary synchronization signal. That is, a preset rule is: When the first subframe is a first subframe or a sixth subframe in a radio frame, and the first subframe is located in the DMTC of the carrier on which the first cell is located, a last OFDM symbol of a first slot included in the first subframe does not include a primary synchronization signal and/or a second last OFDM symbol of a first slot included in the first subframe does not include a secondary synchronization signal.

In this implementation manner, if the first subframe does not include a PSS and/or an SSS, the processor 121 detects no PSS and/or SSS when executing an RRM measurement, and therefore does not incorrectly consider that the first subframe includes DRS sending. In this case, even though the first subframe is a partial subframe, the user equipment does not misinterpret the RRM measurement, thereby ensuring accuracy of the RRM measurement.

The following describes in detail relationships between a radio frame, a subframe, a slot, and an OFDM symbol. For an LTE system, one radio frame includes 10 subframes, and each subframe includes two slots. If a data transmission configuration is a normal cyclic prefix and a subcarrier spacing is 15 KHz, each subframe includes 14 OFDM symbols, and each slot includes seven OFDM symbols. If a data transmission configuration is an extended cyclic prefix and a subcarrier spacing is 15 KHz, each subframe includes 12 OFDM symbols, and each slot includes six OFDM symbols. In an LTE system, a radio frame may be represented by a radio frame index number, and the radio frame index number is any integer value in 0 to 1023. A subframe may be represented by a position in a radio frame, and the position in a radio frame may be represented by a subframe index. The subframe index is any integer value in 0 to 9. A subframe whose subframe index number is M corresponds to an $(M+1)^{th}$ subframe in a radio frame. A slot may also be represented by a position in a radio frame, and the position in a radio frame may be represented by a slot index. The slot index is any integer value in 0 to 19. A slot whose slot index number is N corresponds to an $(N+1)^{th}$ slot in a radio frame. An OFDM symbol may be represented by a position in a subframe, or may be represented by a position in a slot. The position in a subframe may be represented by an OFDM symbol index, the OFDM symbol index is an any integer value in 0 to 13 or 0 to 11, and an OFDM symbol whose OFDM symbol index is K corresponds to a $(K+1)^{th}$ OFDM symbol in a subframe. The position in a slot may also be represented by an OFDM symbol index, the OFDM symbol index is any integer value in 0 to 6 or 0 to 5, and an OFDM symbol whose OFDM symbol index is L corresponds to an $(L+1)^{th}$ OFDM symbol in a slot.

As can be seen from that, if the downlink data transmission configuration is a normal cyclic prefix, the last OFDM symbol of the first slot refers to a seventh OFDM symbol of the first slot, which is also a seventh OFDM symbol included in the first subframe, and the second last OFDM symbol of the first slot refers to a sixth OFDM symbol of the first slot, which is also a sixth OFDM symbol included in the first subframe. If the downlink data transmission configuration is an extended cyclic prefix, the last OFDM symbol of the first slot refers to a sixth OFDM symbol of the first slot, which is also a sixth OFDM symbol included in the first subframe, and the second last OFDM symbol of the first slot refers to a fifth OFDM symbol of the first slot, which is also a fifth OFDM symbol included in the first subframe. A process of analysis for a case in which the downlink data transmission configuration is an extended cyclic prefix is the same as above, and details are not described herein.

Besides, when the first subframe is a partial subframe, to reduce complexity, for data transmission of the first subframe, reference may be made to a data resource mapping manner supported by a downlink pilot timeslot (DwPTS). The DwPTS is a structure in time division duplexing (TDD) and LTE systems, and the DwPTS is included in a special subframe. A frame structure in an existing TDD LTE system includes a downlink subframe, a special subframe, and an uplink subframe, as shown in FIG. 9.

With reference to a quantity of OFDM symbols supported by the DwPTS, when the downlink data transmission configuration is a normal cyclic prefix, the downlink data transmission length of the first subframe is less than 12 OFDM symbols. Further, the downlink data transmission length of the first subframe is less than 12 OFDM symbols but greater than five OFDM symbols.

When the downlink data transmission configuration is an extended cyclic prefix, the downlink data transmission length of the first subframe is less than 10 OFDM symbols, or the downlink data length of the first subframe is less than 10 OFDM symbols but greater than four OFDM symbols.

Besides, considering that when the downlink data transmission configuration is a normal cyclic prefix, a DRS includes 12 OFDM symbols in time, if a data transmission length of the first subframe is less than 12 OFDM symbols, the length is not sufficient to support DRS sending. Therefore, the preset rule may be: When the first subframe is a first subframe or a sixth subframe in a radio frame, and the first subframe is located in the DMTC of the carrier on which the first cell is located, when and only when the data transmission length of the first subframe is less than 12 OFDM symbols, a last OFDM symbol of a first slot included in the first subframe does not include a primary synchronization signal and/or a second last OFDM symbol of a first slot included in the first subframe does not include a secondary synchronization signal. Moreover, considering that when the data transmission length of the first subframe is not greater than five OFDM symbols, the first cell is limited by the data transmission length and therefore cannot send a PSS or an SSS in the first subframe, when the data transmission length of the first subframe is not greater than five OFDM symbols, a DRS-based RRM measurement is not affected, either. Therefore, the preset rule may further be: When the first subframe is a first subframe or a sixth subframe in a radio frame, and the first subframe is located in the DMTC of the carrier on which the first cell is located, when and only when the data transmission length of the first subframe is less than 12 OFDM symbols but greater than five OFDM symbols, a last OFDM symbol of a first slot included in the first subframe does not include a primary synchronization signal and/or a second last OFDM symbol of a first slot included in the first subframe does not include a secondary synchronization signal. A process of analysis for a case in which the downlink data transmission configuration is an extended cyclic prefix is the same as above, and details are not described herein.

In another embodiment of the present invention, if the preset condition is that the first subframe is a first subframe or a sixth subframe in a radio frame, and the first subframe is located in a DMTC of the carrier on which the first cell is located, the data transmission characteristic is that the downlink data transmission length of the first subframe is an element included in a first time set. That is, a preset rule is: When the first subframe is a first subframe or a sixth subframe in a radio frame, and the first subframe is located in the DMTC of the carrier on which the first cell is located, the downlink data transmission length of the first subframe is the element included in the first time set.

In an example, when the downlink data transmission configuration of the first cell is a normal cyclic prefix, the element included in the first time set is only: one or more of three OFDM symbols, six OFDM symbols, or 12 OFDM symbols, and the first time set does not include another element except the one or more of three OFDM symbols, six OFDM symbols, or 12 OFDM symbols. For example, if the element included in the first time set is: three OFDM symbols and six OFDM symbols, the first time set includes only the two elements, and does not include another element. When the downlink data transmission configuration of the first cell is an extended cyclic prefix, the element included in the first time set is: one or more of three OFDM symbols, five OFDM symbols, or 10 OFDM symbols, and the first time set does not include another element except the one or more of three OFDM symbols, five OFDM symbols, or 10 OFDM symbols. For example, if the element included in the first time set is: three OFDM symbols and five OFDM symbols, the first time set includes only the two elements, and does not include another element.

As can be seen from that the element included in the first time set makes the first cell incapable of sending a PSS and/or an SSS in the first subframe. Therefore, when the downlink data transmission length of the first subframe is the element included in the first time set, a DRS-based RRM measurement is not affected, either.

In still another embodiment of the present invention, if the preset condition is that the first subframe is a first subframe or a sixth subframe in a radio frame, and the first subframe is located in a DMTC of the carrier on which the first cell is located, the data transmission characteristic is that the downlink data transmission length of the first subframe is an element included in a second time set. If the preset condition is that the first subframe is a first subframe or a sixth subframe in a radio frame, and the first subframe is not located in a DMTC of the carrier on which the first cell is located, the data transmission characteristic is that the downlink data transmission length of the first subframe is an element included in a third time set. The second time set includes at least one element different from that in the third time set.

In an example, when the downlink data transmission configuration of the first cell is a normal cyclic prefix, the element included in the second time set is only: one or more of three OFDM symbols, six OFDM symbols, or 12 OFDM symbols, and the element included in the third time set is only: one or more of three OFDM symbols, six OFDM symbols, nine OFDM symbols, 10 OFDM symbols, 11 OFDM symbols, or 12 OFDM symbols. When the downlink data transmission configuration of the first cell is an extended cyclic prefix, the element included in the second time set is only: one or more of three OFDM symbols, five OFDM symbols, 10 OFDM symbols, and the element included in the third time set is only: one or more of three OFDM symbols, five OFDM symbols, eight OFDM symbols, nine OFDM symbols, or 10 OFDM symbols.

It should be noted that, if the first subframe is a first subframe or a sixth subframe in a radio frame, and the first subframe is not located in the DMTC of the carrier on which the first cell is located, a data transmission length of the first subframe may be not limited, that is, the downlink data transmission length of the first subframe may be a time resource occupied by any quantity of OFDM symbols. That is, when the downlink data transmission configuration is a normal cyclic prefix, the data transmission length of the first subframe may be any one of 1 to 14 OFDM symbols; or when the downlink data transmission configuration is an extended cyclic prefix, the data transmission length of the first subframe may be any one of 1 to 12 OFDM symbols. However, in a DwPTS, in a case in which the downlink data transmission configuration is a normal cyclic prefix, a downlink data transmission length of the DwPTS is three OFDM symbols, six OFDM symbols, nine OFDM symbols, 10 OFDM symbols, 11 OFDM symbols, or 12 OFDM symbols; or when the downlink data transmission configuration is an extended cyclic prefix, a downlink data transmission length of the DwPTS is three OFDM symbols, five OFDM symbols, eight OFDM symbols, nine OFDM symbols, or 10 OFDM symbols. Therefore, when the downlink data transmission configuration of the first cell is a normal cyclic prefix, the element included in the third time set is only: one or more of three OFDM symbols, six OFDM symbols, nine OFDM symbols, 10 OFDM symbols, 11 OFDM symbols, or 12 OFDM symbols, and does not include another quantity of OFDM symbols; or when the downlink data transmission configuration of the first cell is an extended cyclic prefix, the element included in the third time set is only: one or more of three OFDM symbols, five OFDM symbols, eight OFDM symbols, nine OFDM symbols, or 10 OFDM symbols, and does not include another quantity of OFDM symbols.

As can be seen from that, when the first subframe is not located in the DMTC of the carrier on which the first cell is located, the data transmission length of the first subframe is not limited. This ensures data transmission efficiency, and improves spectrum utilization.

In an embodiment of the present invention, the determining, by the processor, a data transmission characteristic of the first cell in the first subframe based on a preset condition includes: When a time resource of a CSI-RS and/or a CSI-IM of the user equipment overlaps the first subframe, the first subframe includes the CSI-RS and/or the CSI-IM of the user equipment. The CSI-RS and/or the CSI-IM of the user equipment is periodically configured. However, for user equipment in an LTE system release 12, CSI-RS and CSI-IM transmission is not supported in a DwPTS. In this embodiment, the CSI-RS and CSI-IM transmission is supported, and a channel state information measurement and a channel state interference information measurement are implemented.

It should be noted that, in this embodiment of the present invention, the data transmission length of the first subframe may include 14 OFDM symbols if the first threshold corresponds to a value greater than 1 ms.

It should be noted that, in this embodiment of the present invention, the first threshold, the preset condition, the data transmission characteristic, the element included in the first time set, the element included in the second time set, and the element included in the third time set may be pre-configured, for example, may be pre-configured based on a standard protocol specification, or may be set before delivery of the access network device and the user equipment, or may be notified by using higher layer signaling such as radio resource control (RRC) signaling, or may be notified by using physical layer signaling. Specific implementation manners are not limited.

A data receiving method according to an embodiment of the present invention is described above. A person skilled in the art is aware that the method embodiment and the steps and processes may be implemented by hardware. A person skilled in the art may construct corresponding modules and make variations according to the foregoing method embodiment, and these modules and variations shall fall within the protection scope of the present invention. Details are not described herein.

Figure 13:
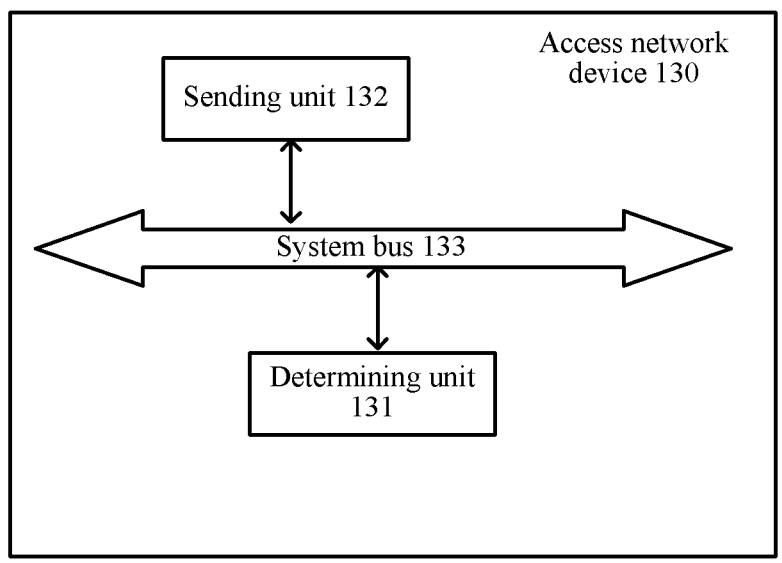
FIG. 13 is a schematic diagram of an access network device according to an embodiment of the present invention.

FIG. 13 is a schematic diagram of an access network device according to an embodiment of the present invention. The access network device is, for example, an LTE base station.

A person skilled in the art may understand that a structure of the access network device shown in FIG. 13 does not limit the access network device, and more or fewer components than those shown in the figure may be included, or some components may be combined, or a different component deployment may be used.

In FIG. 13, the access network device 130 includes a determining unit 131, a sending unit 132, and a system bus 133. Communication and connection between the determining unit 131 and the sending unit 132 are implemented by using the system bus 133.

The determining unit 131 is configured to determine a downlink data transmission length of a first subframe transmitted by a first cell, where the downlink data transmission length of the first subframe is less than a first threshold; and configured to determine a data transmission feature of the first cell in the first subframe based on a preset condition. The sending unit 132 sends, to the first cell in a public address manner, downlink transmission data including the first subframe.

The system bus 133 may include a channel, to transfer information between the components of the device 130 (for example, the determining unit 131 and the sending unit 132).

Functions of the determining unit 131 are described below in detail.

In an example, a data transmission start position of the first subframe is on a subframe boundary, and the first subframe is a last subframe in one burst data transmission, as shown in FIG. 6. In FIG. 6, the first subframe is a last subframe in one burst data transmission (a fifth subframe) when the first cell transmits data on a working carrier of the first cell.

In an embodiment of the present invention, the sending unit 132 sends control information, and the control information indicates that the downlink data transmission length of the first subframe is less than the first threshold. It should be noted that, in this embodiment of the present invention, the sending, by the sending unit 132, control information may include: sending, by a cell served by the access network device, the control information. The access network device herein may be a base station. For example, sending, by a sending unit in a first access network device in FIG. 4, the control information may be understood as sending, by the first cell or a second cell, the control information.

In an example, a subframe that carries the control information is any subframe that is included in the first cell and that is in a transmission burst, referring to FIG. 6; or may be any subframe in the second cell. More specifically, the subframe that carries the control information may be any subframe within a time range, corresponding to a data burst of the first cell, of the second cell. The second cell and the first cell are jointly used through CA or DC. Preferably, a carrier on which the second cell is located and a working frequency range of the second cell belong to a frequency resource included in a licensed frequency band. For the time range, corresponding to the data burst of the first cell, of the second cell, refer to FIG. 7. That is, the control information may be sent by using the first cell, or may be sent by using the second cell. That is, the control information may be carried by using time and frequency resources included in a service data channel of the first cell or time and frequency resources included in a control data channel of the first cell, or may be carried by using time and frequency resources included in a service data channel of the second cell or time and frequency resources included in a control data channel of the second cell. The control information may be user equipment specific control information, or may be cell specific control information. Particularly, when the control information is user equipment specific control information, the control information may be carried in downlink data scheduling signaling for scheduling the user equipment.

The control data channel is one or more of control data channels supported by an LTE system, such as a PDCCH, a PCFICH, a PHICH, an EPDCCH, and a PBCH.

The service data channel is one or more of service data channels supported by the LTE system, such as a PDSCH and a PMCH.

It should be noted that, in this embodiment of the present invention, the control information indicates that downlink data transmission of the first subframe is less than the first threshold. When the first threshold is 1 ms, the control information may directly indicate that a target subframe is the first subframe (or a partial subframe), or may directly indicate a data transmission length of a target subframe. The target subframe herein may be any subframe in a data transmission burst of the first cell, for example, any one of a first/second/third/fourth/fifth subframe in FIG. 6. Alternatively, the target subframe may be any subframe on a carrier on which the first cell is located, and in this case, in the target subframe, the first cell may preempt an unlicensed frequency band resource, or may preempt no unlicensed frequency band resource. When the first threshold is greater than 1 ms, the control information may indicate whether the target subframe is a subframe in a data transmission burst of the first cell. Explanation of a data transmission burst is the same as above, and details are not described.

In another embodiment of the present invention, the sending unit 132 sends a reference signal including a reference sequence, and the reference signal including a reference sequence indicates that the downlink data transmission length of the first subframe is less than the first threshold.

Specifically, the sending unit 132 may send the reference signal including a reference sequence in any subframe in one burst data transmission including the first subframe, to indicate that the downlink data transmission length of the first subframe is less than the first threshold.

Preferably, the determining unit 131 adds the reference signal including a reference sequence to a third OFDM symbol in one burst data transmission including the first subframe, to indicate that the downlink data transmission length of the first subframe is less than the first threshold. Further, the determining unit 131 adds a primary synchronization signal (PSS) to a third OFDM symbol in one burst data transmission including the first subframe, to indicate that the downlink data transmission length of the first subframe is less than the first threshold. That is, the determining unit 131 adds the PSS to a third OFDM symbol in the target subframe, to indicate that the target subframe is the first subframe.

The reference sequence may include but is not limited to the following sequences: a CAZAC sequence, a binary sequence, an m sequence, a pseudo-random sequence, and a ZC sequence.

In still another embodiment of the present invention, the sending unit 132 is further configured to send pre-configuration information, and the pre-configuration information indicates a longest time within which the first cell transmits data on a carrier on which the first cell is located. The longest data transmission time refers to a maximum time range of one burst data transmission of the first cell on the carrier on which the first cell is located. For example, in Japan, for use of an unlicensed frequency band, it is clearly defined in a regulation that a maximum data transmission time is 4 ms. In addition, in Europe, for use of an unlicensed frequency band, it is clearly defined in a regulation that a maximum data transmission time is 10 ms or 13 ms or 8 ms. Referring to FIG. 7, FIG. 7 is a schematic diagram of determining a first subframe based on pre-configuration information.

Specifically, the determining unit 131 configures, for user equipment by using higher layer signaling, the pre-configuration information indicating the longest data transmission time, for example, indicates the pre-configuration information to the user equipment by using radio resource control (RRC) signaling.

In an example, when a downlink data transmission configuration of the first cell is a normal cyclic prefix, the first threshold is 14 OFDM symbols or 1 ms (millisecond); and in this case, a complete subframe includes 14 OFDM symbols, or a time resource occupied by a complete subframe is 1 millisecond (1 ms). When a downlink data transmission configuration of the first cell is an extended cyclic prefix, the first threshold is 12 OFDM symbols or 1 ms; and in this case, a complete subframe includes 12 OFDM symbols, or a time resource occupied by a complete subframe is 1 millisecond (1 ms). Therefore, when the downlink data transmission configuration of the first cell is a normal cyclic prefix, and the first threshold is 14 OFDM symbols or 1 ms, or when the downlink data transmission configuration of the first cell is an extended cyclic prefix, and the first threshold is 12 OFDM symbols or 1 ms, the first subframe is an incomplete subframe, that is, a partial subframe, because the downlink data transmission length of the first subframe is less than the first threshold.

In an embodiment of the present invention, if the preset condition is that the first subframe is a first subframe (that is, a subframe 0) or a sixth subframe (that is, a subframe 5) in a radio frame, and the first subframe is located in a DMTC of the carrier on which the first cell is located, the data transmission characteristic is that a last OFDM symbol of a first slot included in the first subframe does not include a primary synchronization signal and/or a second last OFDM symbol of a first slot included in the first subframe does not include a secondary synchronization signal. That is, when the first subframe is a first subframe or a sixth subframe in a radio frame, and the first subframe is located in the DMTC of the carrier on which the first cell is located, a last OFDM symbol of a first slot included in the first subframe does not include a primary synchronization signal and/or a second last OFDM symbol of a first slot included in the first subframe does not include a secondary synchronization signal.

As can be seen from that, if the downlink data transmission configuration is a normal cyclic prefix, the last OFDM symbol of the first slot refers to a seventh OFDM symbol of the first slot, which is also a seventh OFDM symbol included in the first subframe, and the second last OFDM symbol of the first slot refers to a sixth OFDM symbol of the first slot, which is also a sixth OFDM symbol included in the first subframe. If the downlink data transmission configuration is an extended cyclic prefix, the last OFDM symbol of the first slot refers to a sixth OFDM symbol of the first slot, which is also a sixth OFDM symbol included in the first subframe, and the second last OFDM symbol of the first slot refers to a fifth OFDM symbol of the first slot, which is also a fifth OFDM symbol included in the first subframe. A process of analysis for a case in which the downlink data transmission configuration is an extended cyclic prefix is the same as above, and details are not described herein.

Besides, when the first subframe is a partial subframe, to reduce complexity, for data transmission of the first subframe, reference may be made to a data resource mapping manner supported by a downlink pilot timeslot (DwPTS). The DwPTS is a structure in time division duplexing (TDD) and LTE systems, and the DwPTS is included in a special subframe. A frame structure in an existing TDD LTE system includes a downlink subframe, a special subframe, and an uplink subframe, as shown in FIG. 9.

With reference to a quantity of OFDM symbols supported by the DwPTS, when the downlink data transmission configuration is a normal cyclic prefix, the downlink data transmission length of the first subframe is less than 12 OFDM symbols. Further, the downlink data transmission length of the first subframe is less than 12 OFDM symbols but greater than five OFDM symbols. When the downlink data transmission configuration is an extended cyclic prefix, the downlink data transmission length of the first subframe is less than 10 OFDM symbols, or the downlink data length of the first subframe is less than 10 OFDM symbols but greater than four OFDM symbols.

Besides, considering that when the downlink data transmission configuration is a normal cyclic prefix, a DRS includes 12 OFDM symbols in time, if a data transmission length of the first subframe is less than 12 OFDM symbols, the length is not sufficient to support DRS sending. Therefore, a preset rule may be: When the first subframe is a first subframe or a sixth subframe in a radio frame, and the first subframe is located in the DMTC of the carrier on which the first cell is located, when and only when the data transmission length of the first subframe is less than 12 OFDM symbols, a last OFDM symbol of a first slot included in the first subframe does not include a primary synchronization signal and/or a second last OFDM symbol of a first slot included in the first subframe does not include a secondary synchronization signal. Moreover, considering that when the data transmission length of the first subframe is not greater than five OFDM symbols, the first cell is limited by the data transmission length and therefore cannot send a PSS or an SSS in the first subframe, when the data transmission length of the first subframe is not greater than five OFDM symbols, a DRS-based RRM measurement is not affected, either. Therefore, the preset rule may further be: When the first subframe is a first subframe or a sixth subframe in a radio frame, and the first subframe is located in the DMTC of the carrier on which the first cell is located, when and only when the data transmission length of the first subframe is less than 12 OFDM symbols but greater than five OFDM symbols, a last OFDM symbol of a first slot included in the first subframe does not include a primary synchronization signal and/or a second last OFDM symbol of a first slot included in the first subframe does not include a secondary synchronization signal. A process of analysis for a case in which the downlink data transmission configuration is an extended cyclic prefix is the same as above, and details are not described herein.

In another embodiment of the present invention, if the preset condition is that the first subframe is a first subframe or a sixth subframe in a radio frame, and the first subframe is located in a DMTC of the carrier on which the first cell is located, the data transmission characteristic is that the downlink data transmission length of the first subframe is an element included in a first time set. That is, a preset rule is: When the first subframe is a first subframe or a sixth subframe in a radio frame, and the first subframe is located in the DMTC of the carrier on which the first cell is located, the downlink data transmission length of the first subframe is the element included in the first time set.

In an example, when the downlink data transmission configuration of the first cell is a normal cyclic prefix, the element included in the first time set is only: one or more of three OFDM symbols, six OFDM symbols, or 12 OFDM symbols, and the first time set does not include another element except the one or more of three OFDM symbols, six OFDM symbols, or 12 OFDM symbols. For example, if the element included in the first time set is: three OFDM symbols and six OFDM symbols, the first time set includes only the two elements, and does not include another element. When the downlink data transmission configuration of the first cell is an extended cyclic prefix, the element included in the first time set is: one or more of three OFDM symbols, five OFDM symbols, or 10 OFDM symbols, and the first time set does not include another element except the one or more of three OFDM symbols, five OFDM symbols, or 10 OFDM symbols. For example, if the element included in the first time set is: three OFDM symbols and five OFDM symbols, the first time set includes only the two elements, and does not include another element.

As can be seen from that the element included in the first time set makes the first cell incapable of sending a PSS and/or an SSS in the first subframe. Therefore, when the downlink data transmission length of the first subframe is the element included in the first time set, a DRS-based RRM measurement is not affected, either.

In still another embodiment of the present invention, if the preset condition is that the first subframe is a first subframe or a sixth subframe in a radio frame, and the first subframe is located in a DMTC of the carrier on which the first cell is located, the data transmission characteristic is that the downlink data transmission length of the first subframe is an element included in a second time set. If the preset condition is that the first subframe is a first subframe or a sixth subframe in a radio frame, and the first subframe is not located in a DMTC of the carrier on which the first cell is located, the data transmission characteristic is that the downlink data transmission length of the first subframe is an element included in a third time set. The second time set includes at least one element different from that in the third time set.

In an example, when the downlink data transmission configuration of the first cell is a normal cyclic prefix, the element included in the second time set is only: one or more of three OFDM symbols, six OFDM symbols, or 12 OFDM symbols, and the element included in the third time set is only: one or more of three OFDM symbols, six OFDM symbols, nine OFDM symbols, 10 OFDM symbols, 11 OFDM symbols, or 12 OFDM symbols. When the downlink data transmission configuration of the first cell is an extended cyclic prefix, the element included in the second time set is only: one or more of three OFDM symbols, five OFDM symbols, 10 OFDM symbols, and the element included in the third time set is only: one or more of three OFDM symbols, five OFDM symbols, eight OFDM symbols, nine OFDM symbols, or 10 OFDM symbols.

It should be noted that, if the first subframe is a first subframe or a sixth subframe in a radio frame, and the first subframe is not located in the DMTC of the carrier on which the first cell is located, a data transmission length of the first subframe may be not limited, that is, the downlink data transmission length of the first subframe may be a time resource occupied by any quantity of OFDM symbols. That is, when the downlink data transmission configuration is a normal cyclic prefix, the data transmission length of the first subframe may be any one of 1 to 14 OFDM symbols; or when the downlink data transmission configuration is an extended cyclic prefix, the data transmission length of the first subframe may be any one of 1 to 12 OFDM symbols. However, in a DwPTS, in a case in which the downlink data transmission configuration is a normal cyclic prefix, a downlink data transmission length of the DwPTS is three OFDM symbols, six OFDM symbols, nine OFDM symbols, 10 OFDM symbols, 11 OFDM symbols, or 12 OFDM symbols; or when the downlink data transmission configuration is an extended cyclic prefix, a downlink data transmission length of the DwPTS is three OFDM symbols, five OFDM symbols, eight OFDM symbols, nine OFDM symbols, or 10 OFDM symbols. Therefore, when the downlink data transmission configuration of the first cell is a normal cyclic prefix, the element included in the third time set is only: one or more of three OFDM symbols, six OFDM symbols, nine OFDM symbols, 10 OFDM symbols, 11 OFDM symbols, or 12 OFDM symbols, and does not include another quantity of OFDM symbols; or when the downlink data transmission configuration of the first cell is an extended cyclic prefix, the element included in the third time set is only: one or more of three OFDM symbols, five OFDM symbols, eight OFDM symbols, nine OFDM symbols, or 10 OFDM symbols, and does not include another quantity of OFDM symbols.

As can be seen from that, when the first subframe is not located in the DMTC of the carrier on which the first cell is located, the data transmission length of the first subframe is not limited. This ensures data transmission efficiency, and improves spectrum utilization.

It should be noted that, in this embodiment of the present invention, the determining, by the determining unit 131, a downlink data transmission length of a first subframe transmitted by a first cell may be understood as determining, by the determining unit 131, a downlink data transmission length of transmission of the first cell in the first subframe. The determining unit 131 may determine the downlink data transmission length of the first subframe based on service load, a time position of a resource preempted on an unlicensed frequency band, and a maximum time of one burst data transmission on the unlicensed frequency band, or may determine the downlink data transmission length of the first subframe in another manner, which is not limited herein.

In an embodiment of the present invention, the determining, by the determining unit 131, a data transmission characteristic of the first cell in the first subframe based on a preset condition includes: when the first subframe includes a CSI-RS and/or a CSI-IM, sending the first subframe including the CSI-RS and/or the CSI-IM. The CSI-RS and/or the CSI-IM is periodically configured.

It should be noted that, in this embodiment of the present invention, the data transmission length of the first subframe may include 14 OFDM symbols if the first threshold corresponds to a value greater than 1 ms.

It should be noted that, in this embodiment of the present invention, the first threshold, the preset condition, the data transmission characteristic, the element included in the first time set, the element included in the second time set, and the element included in the third time set may be pre-configured, for example, may be pre-configured based on a standard protocol specification, or may be set before delivery of the access network device and the user equipment, or may be notified by using higher layer signaling such as radio resource control (RRC) signaling, or may be notified by using physical layer signaling. Specific implementation manners are not limited.

A data sending method according to an embodiment of the present invention is described above. A person skilled in the art is aware that the method embodiment and the steps and processes may be implemented by hardware. A person skilled in the art may construct corresponding modules and make variations according to the foregoing method embodiment, and these modules and variations shall fall within the protection scope of the present invention. Details are not described herein.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objectives, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A data receiving method, comprising:
   determining, by a user equipment, control information of a first cell;
   determining, by the user equipment, a first subframe in the first cell based on the control information, wherein a downlink data transmission length of the first subframe is less than a first threshold; and
   when the first subframe is a first subframe in a radio frame or a sixth subframe in a radio frame, a downlink data transmission configuration of the first cell is a normal cyclic prefix, and the downlink data transmission length of the first subframe is less than 12 orthogonal frequency-division multiplexing (OFDM) symbols,
   determining, by the user equipment, that a last OFDM symbol of a first slot included in the first subframe does not include a primary synchronization signal and a second to last OFDM symbol of a first slot included in the first subframe does not include a secondary synchronization signal.

2. The method according to claim 1, wherein
the determining, by the user equipment, the control information of a first cell comprises:
detecting, by the user equipment, the control information on at least one of a control data channel or a service data channel of the first cell.

3. The method according to claim 1, wherein the first threshold is a value greater than or equal to 1 millisecond (ms).

4. The method according to claim 1, wherein a data transmission start position of the first subframe is on a subframe boundary, and the first subframe is a last subframe in one burst data transmission.

5. A data sending method, comprising:
determining, by an access network device, a downlink data transmission length of a first subframe transmitted by a first cell, wherein the downlink data transmission length of the first subframe is less than a first threshold;
when the first subframe is a first subframe in a radio frame or a sixth subframe in a radio frame, a downlink data transmission configuration of the first cell is a normal cyclic prefix, and the downlink data transmission length of the first subframe is less than 12 orthogonal frequency-division multiplexing (OFDM) symbols,
determining, by the access network device, that a last OFDM symbol of a first slot included in the first subframe does not include a primary synchronization signal and a second to last OFDM symbol of a first slot included in the first subframe does not include a secondary synchronization signal.

6. The method according to claim 5, further comprising:
sending, by the access network device, control information, wherein the control information indicates that the downlink data transmission length of the first subframe is less than the first threshold.

7. The method according to claim 5, wherein the first threshold is a value not less than 1 millisecond (ms).

8. The method according to claim 5, wherein a data transmission start position of the first subframe is on a subframe boundary, and the first subframe is a last subframe in a transmission burst.

9. A user equipment comprising:
at least one processor; and
a non-transitory computer-readable storage medium coupled to the at least one processor and storing programming instructions for execution by the processor, the programming instructions instruct the at least one processor to:
determine control information of a first cell;
determine a first subframe in the first cell based on the control information, wherein a downlink data transmission length of the first subframe is less than a first threshold; and
when the first subframe is a first subframe in a radio frame or a sixth subframe in a radio frame, a downlink data transmission configuration of the first cell is a normal cyclic prefix, and the downlink data transmission length of the first subframe is less than 12 orthogonal frequency-division multiplexing (OFDM) symbols,
determine that a last OFDM symbol of a first slot included in the first subframe does not include a primary synchronization signal and a second to last OFDM symbol of a first slot included in the first subframe does not include a secondary synchronization signal.

10. The user equipment according to claim 9, wherein the control information is used to indicate that the downlink data transmission length of the first subframe is less than the first threshold.

11. The user equipment according to claim 9, wherein the first threshold is a value greater than or equal to 1 millisecond (ms).

12. The user equipment according to claim 9, wherein a data transmission start position of the first subframe is on a subframe boundary, and the first subframe is a last subframe in a transmission burst.

13. An access network device, the access network device comprising:
at least one processor; and
a non-transitory computer-readable storage medium coupled to the at least one processor and storing programming instructions for execution by the processor, the programming instructions instruct the at least one processor to:
determine a downlink data transmission length of a first subframe transmitted by a first cell, wherein the downlink data transmission length of the first subframe is less than a first threshold;
when the first subframe is a first subframe in a radio frame or a sixth subframe in a radio frame, a downlink data transmission configuration of the first cell is a normal cyclic prefix, and the downlink data transmission length of the first subframe is less than 12 orthogonal frequency-division multiplexing (OFDM) symbols,
determine that a last OFDM symbol of a first slot included in the first subframe does not include a primary synchronization signal and a second to last OFDM symbol of a first slot included in the first subframe does not include a secondary synchronization signal.

14. The access network device according to claim 13, wherein the access network device further comprises a transmitter, wherein the transmitter is configured to send control information, wherein the control information indicates that the downlink data transmission length of the first subframe is less than the first threshold.

15. The access network device according to claim 13, wherein the first threshold is a value greater than or equal to 1 millisecond (ms).

16. The access network device according to claim 13, wherein a data transmission start position of the first subframe is on a subframe boundary, and the first subframe is a last subframe in a transmission burst.

* * * * *